Sept. 12, 1933.  J. W. DEHN  1,926,894
SELECTOR TESTING SYSTEM
Filed April 30, 1932    16 Sheets-Sheet 1

INVENTOR
J. W. DEHN
BY
P. C. Smith
ATTORNEY

Sept. 12, 1933.  J. W. DEHN  1,926,894
SELECTOR TESTING SYSTEM
Filed April 30, 1932  16 Sheets-Sheet 2

INVENTOR
J. W. DEHN
BY
P. C. Smith
ATTORNEY

Sept. 12, 1933.  J. W. DEHN  1,926,894
SELECTOR TESTING SYSTEM
Filed April 30, 1932  16 Sheets-Sheet 11

INVENTOR
J. W. DEHN
BY
P. C. Smith
ATTORNEY

Sept. 12, 1933.  J. W. DEHN  1,926,894
SELECTOR TESTING SYSTEM
Filed April 30, 1932    16 Sheets-Sheet 12

INVENTOR
J. W. DEHN
BY
P. C. Smith
ATTORNEY

Sept. 12, 1933.                     J. W. DEHN                     1,926,894
                              SELECTOR TESTING SYSTEM
                              Filed April 30, 1932            16 Sheets-Sheet 13

INVENTOR
J. W. DEHN
BY
P. C. Smith
ATTORNEY

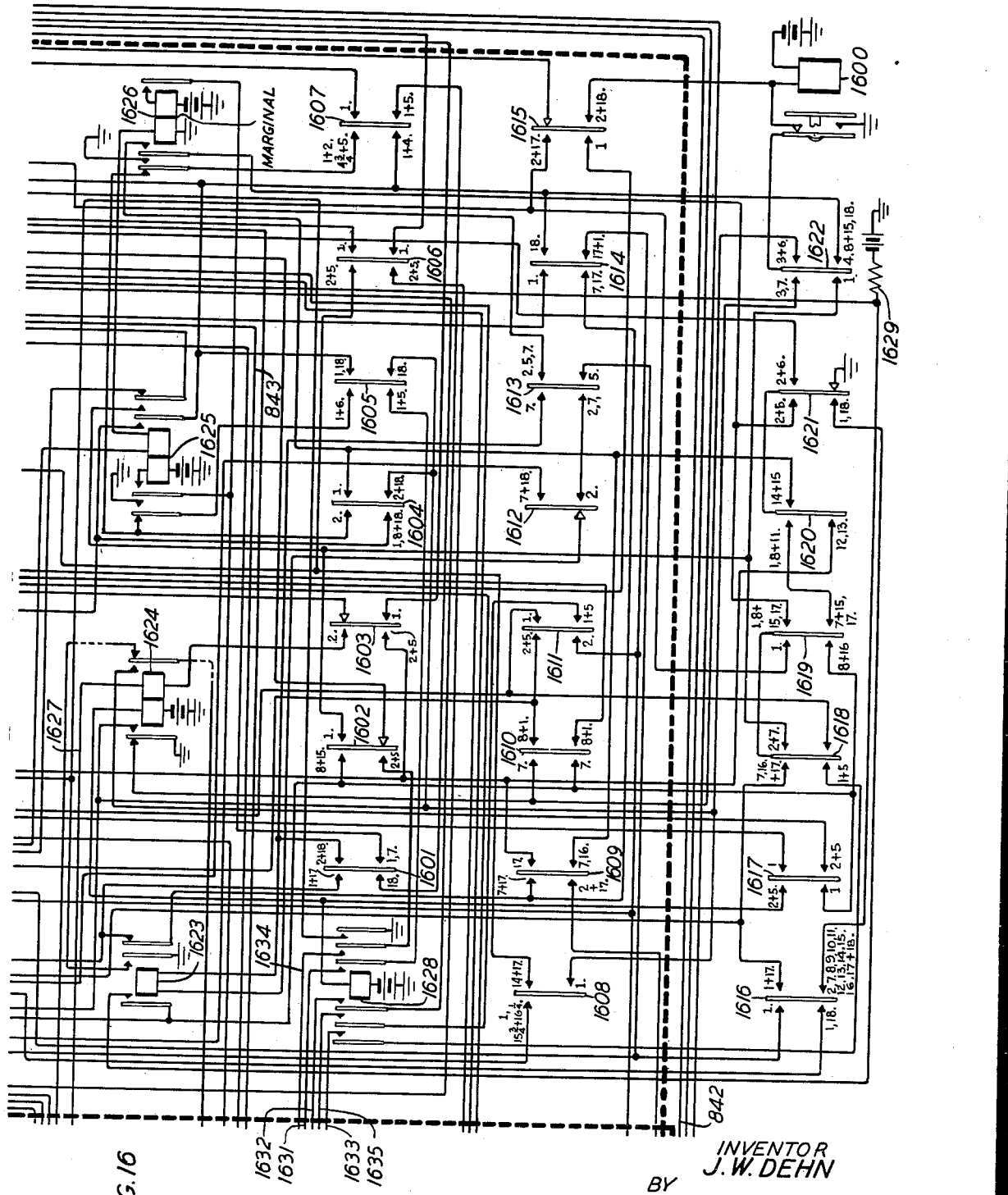

Patented Sept. 12, 1933

1,926,894

UNITED STATES PATENT OFFICE 1,926,894

SELECTOR TESTING SYSTEM

Joseph W. Dehn, Brooklyn, N. Y., assignor to Bell Telephone Laboratories, Incorporated, New York, N. Y., a corporation of New York Application April 30, 1932. Serial No. 608,381

21 Claims. (Cl. 179—175.21)

This invention relates to testing the operation of automatic telephone switching apparatus and has for its object to insure the proper performance of the charging function of such apparatus.

More specifically the invention embodies an automatic routine testing arrangement for testing all types of district selectors, but more especially those which have equipment associated therewith by means of which charges are assessed in accordance with the destination and duration of calls. Such district selectors are provided with means for recording the zone to which the call is directed and with means for measuring a definite time interval, together with means for applying charging current to the calling line under the joint control of the recording means and the time measuring means. The testing device, therefore, has means for counting the number of applications of metering current, means for measuring the elapsed time and means for stopping the progress of a call if the applications of metering current are wrong in number or in time of application.

District selector circuits of the type above mentioned are disclosed and claimed in Patent No. 1,859,924 granted May 24, 1932, to L. H. Johnson et al., in Patent No. 1,837,206 granted December 22, 1931, to R. E. Collis, and in Patent No. 1,823,040 granted September 15, 1931, to A. E. Hague. A testing device in which the present testing arrangement is adapted for use is disclosed in U. S. Patent 1,650,721 to R. E. Peoples, granted November 29, 1927.

The invention will be more clearly understood from a consideration of the following description together with the accompanying drawings in which:

Figs. 1 to 8 disclose a portion of the test circuit;

Figs. 13 to 16 show the line finder and district selector circuits.

Figure 1:
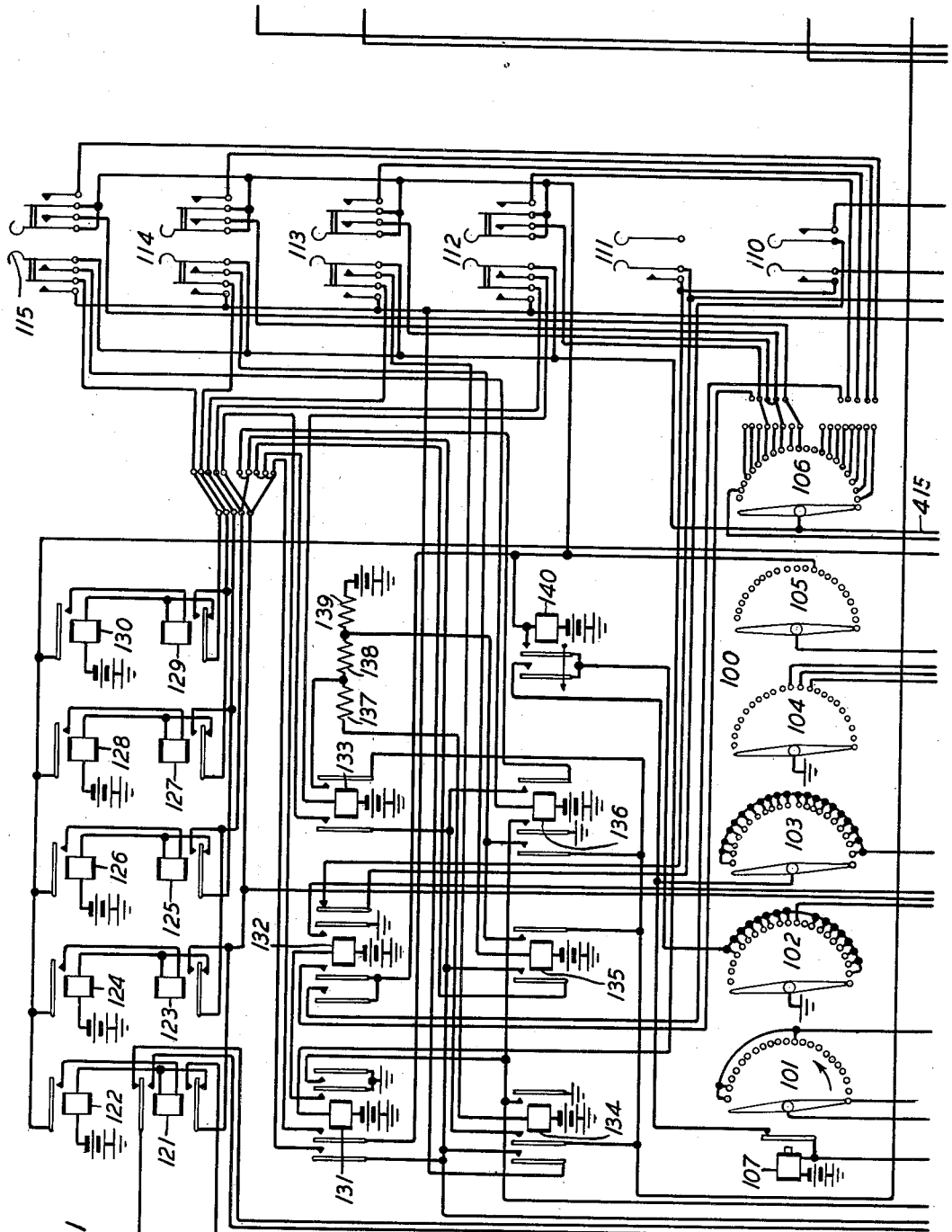
Figure 2:
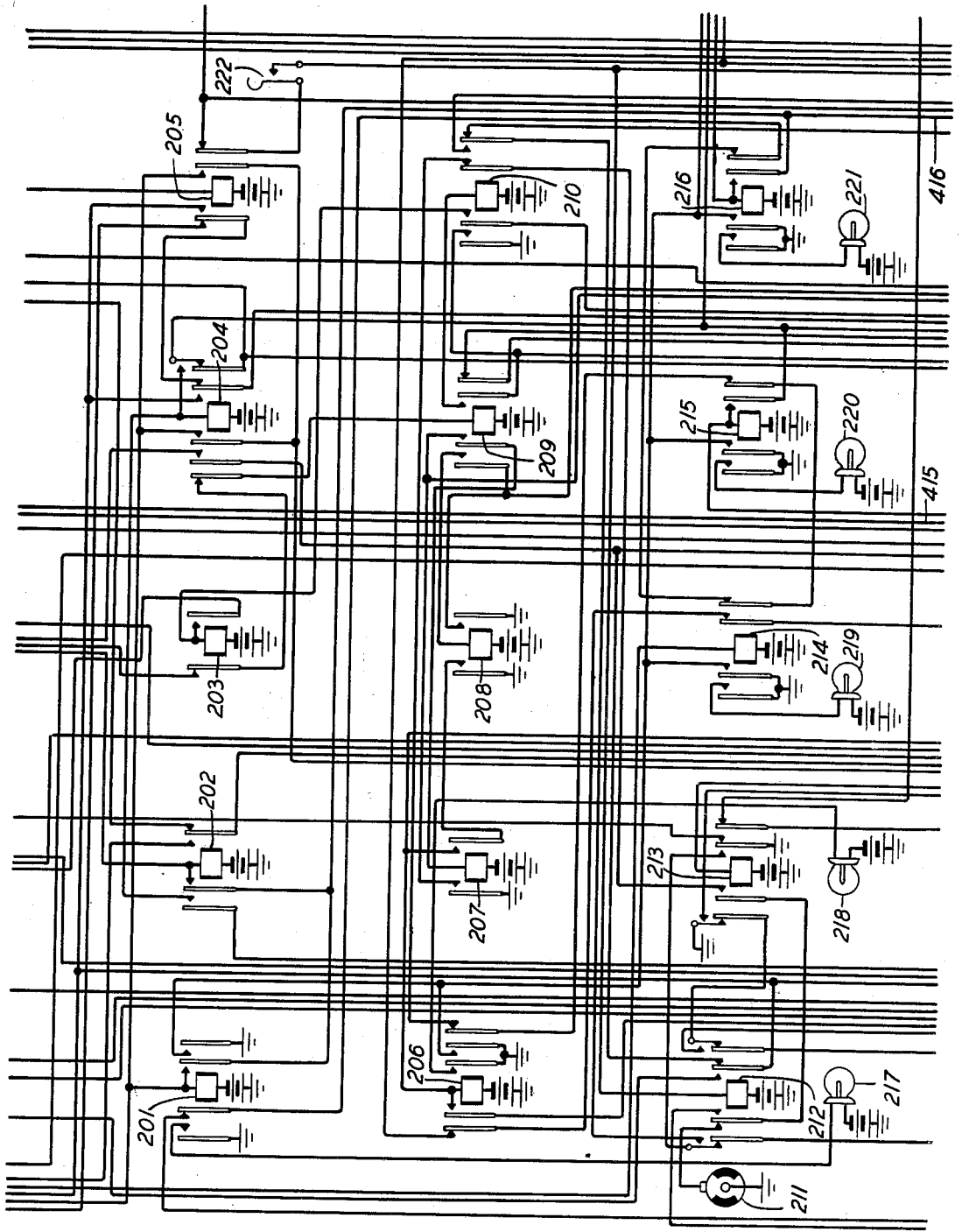
Figure 3:
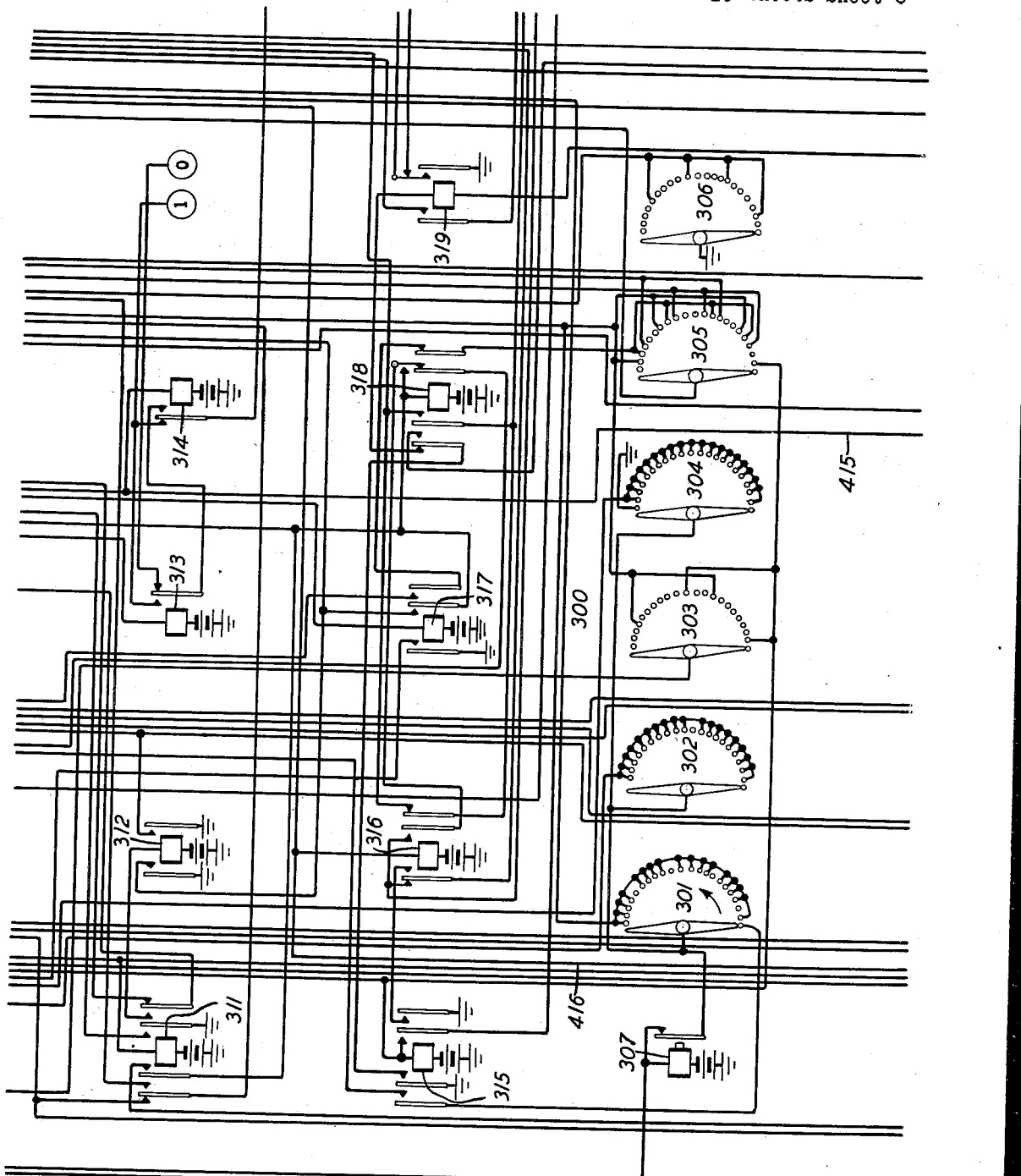

The circuits for testing the metering functions of the district selector are essentially additions to the testing features of the above identified Peoples patent. In general, therefore, only the testing features not present in that patent have been shown in the present disclosure. However, for purposes of reference it may be stated that the district class sequence switch of Fig. 4 performs the same functions as sequence switch 300 of the Peoples patent. The test sequence switch of Fig. 5 corresponds to sequence switch 600, the test class sequence switch of Fig. 6 corresponds to sequence switch 800, the sender sequence switch of Fig. 7 corresponds to sequence switch 900, and the connector sequence switch of Fig. 8 corresponds to sequence switch 1000. Similarly, brush 810 is carried by the master selector which corresponds to switch 1910 of the Peoples patent. Brushes 820 and 830 belong to group selectors corresponding to group selectors 1710 and 1730, brushes 840 and 841 belong to the connector selector corresponding to connector selector 1920 and brush 850 belongs to the trouble timing switch corresponding to the timing switch 1820. A district selector and message register connector circuit of the type shown in the above identified Johnston et al. patent has been selected for the present disclosure.

A brief statement of the functioning of the test circuit and the selector will first be given. When the operation of the test circuit is started the master selector, group selectors and connector selector are positioned to connect the test circuit with the district selector in parallel with the link circuit. A test is made to determine the condition of the district selector which may be busy, idle and awaiting selection by a link circuit, or idle and connected with a link circuit. In the first case, the test circuit waits for the selector to be restored to normal and then seizes it. In the second case, it seizes it immediately and in the third case simulates a call which is immediately abandoned so as to free the district selector from the link circuit. At the end of these operations the connector sequence switch of Fig. 8 stands in position 8. The sender sequence switch of Fig. 7 next functions, first to cause the line finder to find the line finder test line, then to position the district selector on the district selector test line and finally to control talking selection after which it is advanced to position 18. The test sequence switch of Fig. 5 then takes up its function and applies tests to the trunk conductors and the supervisory relays 1429 and 1431. The tests which form the subject matter of the present invention are applied in position 6 of the test sequence switch 500.

Figure 4:
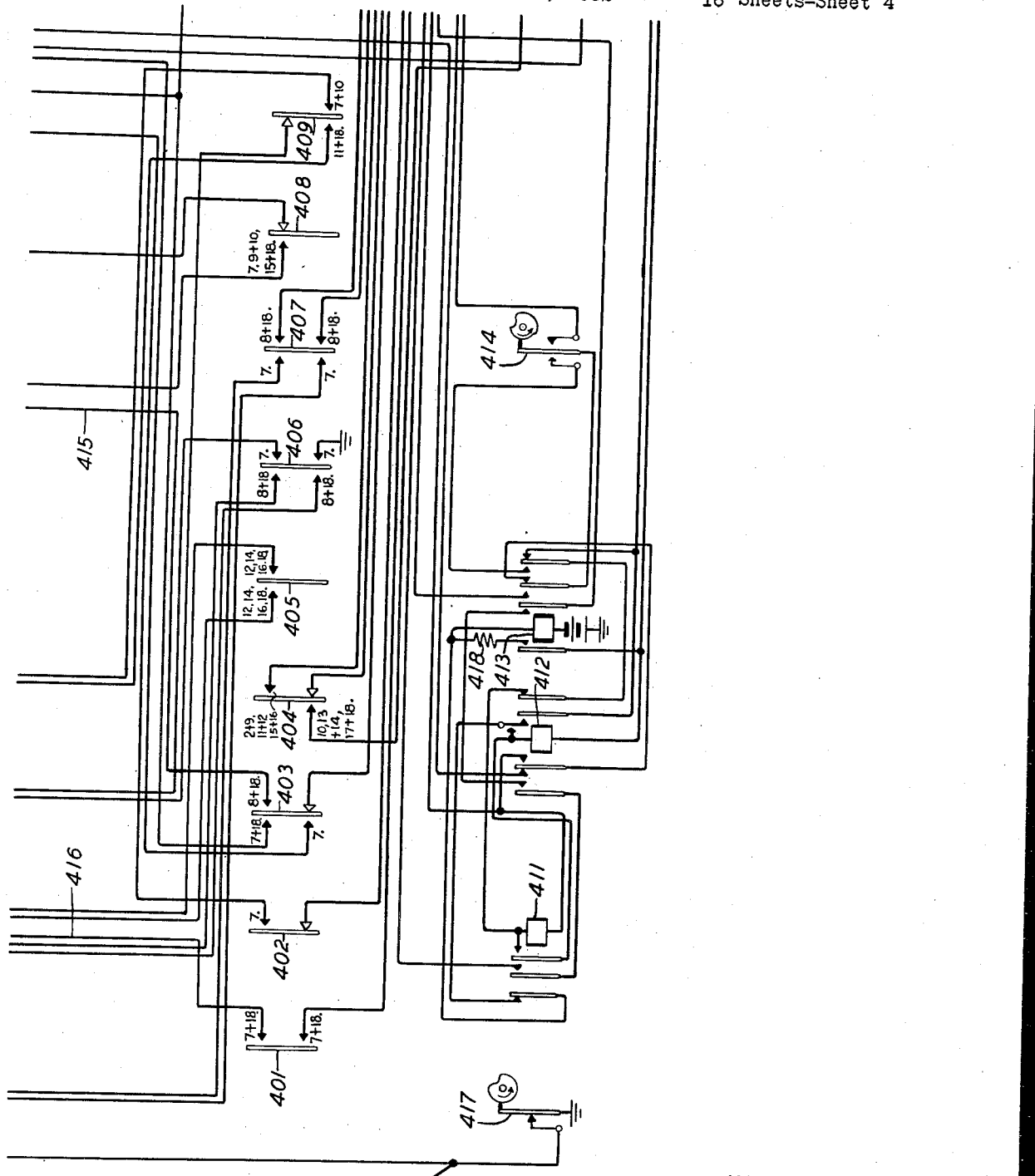
Figure 5:
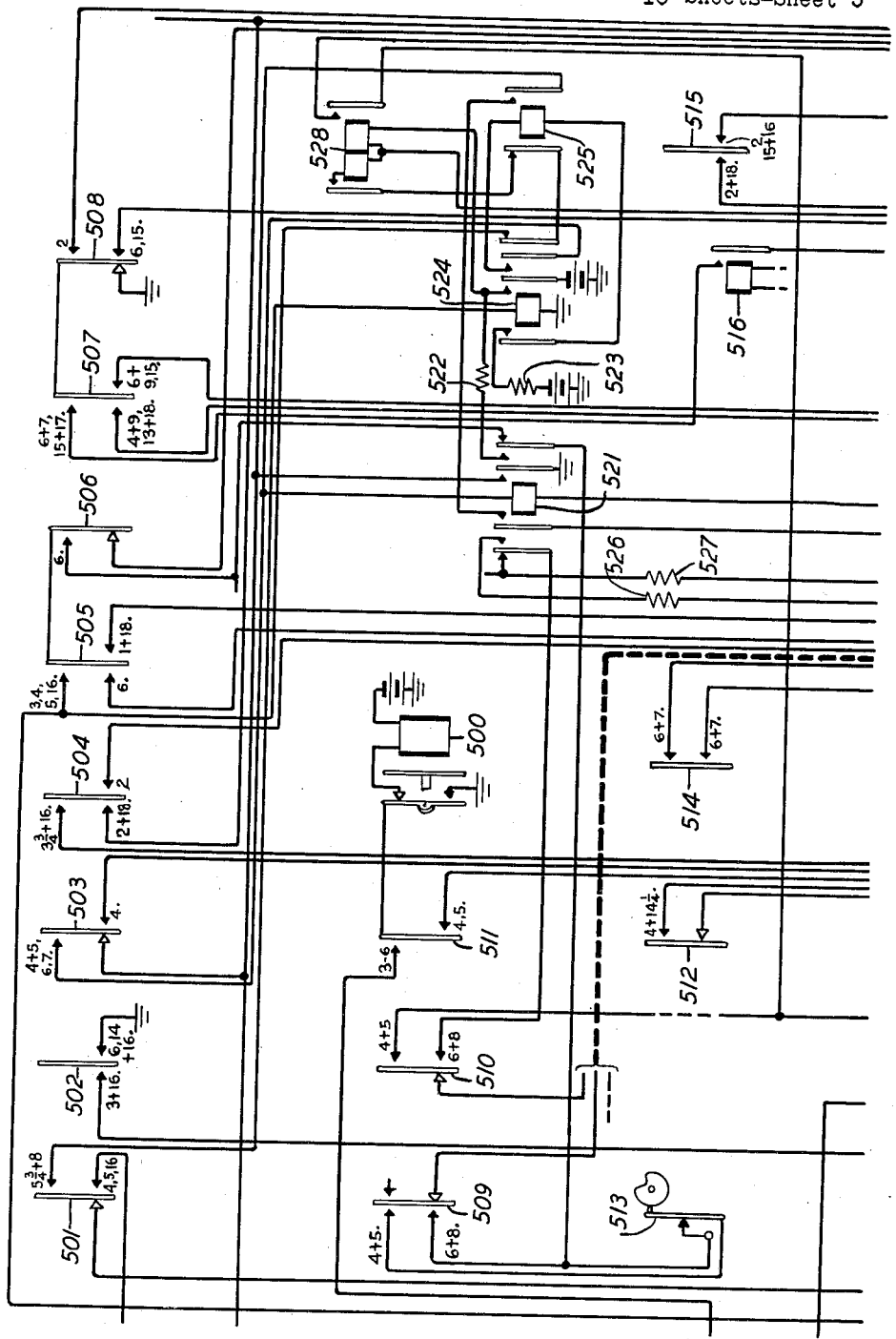

The district class sequence switch of Fig. 4 is positioned in accordance with the type of class of district selector with which the test circuit is connected. In all, there are seventeen classes of district selectors, depending on the kind of line served. There may be flat rate lines, coin lines, and message rate lines, either individual or two-party. In addition the selector may be equipped to charge for overtime or in addition may make a multiple charge in accordance with a zone registration, applying an overtime charge for all zones but zero or for all zones but zero and 1. The district selector disclosed is one arranged to serve two-party message rate lines, to charge according to zone and to make an overtime charge in all zones but zero and in consequence when the test circuit is associated with this district the district class sequence switch of Fig. 4 is automatically advanced to position 17.

The test class sequence switch is positioned under the control of a set of keys, one for each test position and one or more tests may be made by operating the corresponding keys. When the connector sequence switch reaches position 8 the test class sequence switch is positioned for the first test call and is advanced from position to position at the termination of each test call. The test calls are the same as those described in the above identified Peoples patent, namely:

In position 1—call to an operator
In position 2—a non-charge call to a subscriber
In position 3—a charge call to a busy subscriber
In position 4—an unanswered call
In position 5—a charge call—line falsely grounded
In position 6—charge call—second-party registration
In position 7—overflow
In position 8—call abandoned before district selections
In position 9—call abandoned after district selections Of these test calls only those made in positions 3, 5 and 6 of the test sequence switch are of interest in this connection.

In preparation for testing selectors which are equipped for zone and overtime metering, one of the zone keys 110 to 115 must be operated, to set up the proper zone condition and key 222, if the overtime metering is also to be tested. These keys may be operated at the beginning of a routine test of all types of selectors since they only become effective in the proper positions of the district class sequence switch of Fig. 4.

Figure 7:
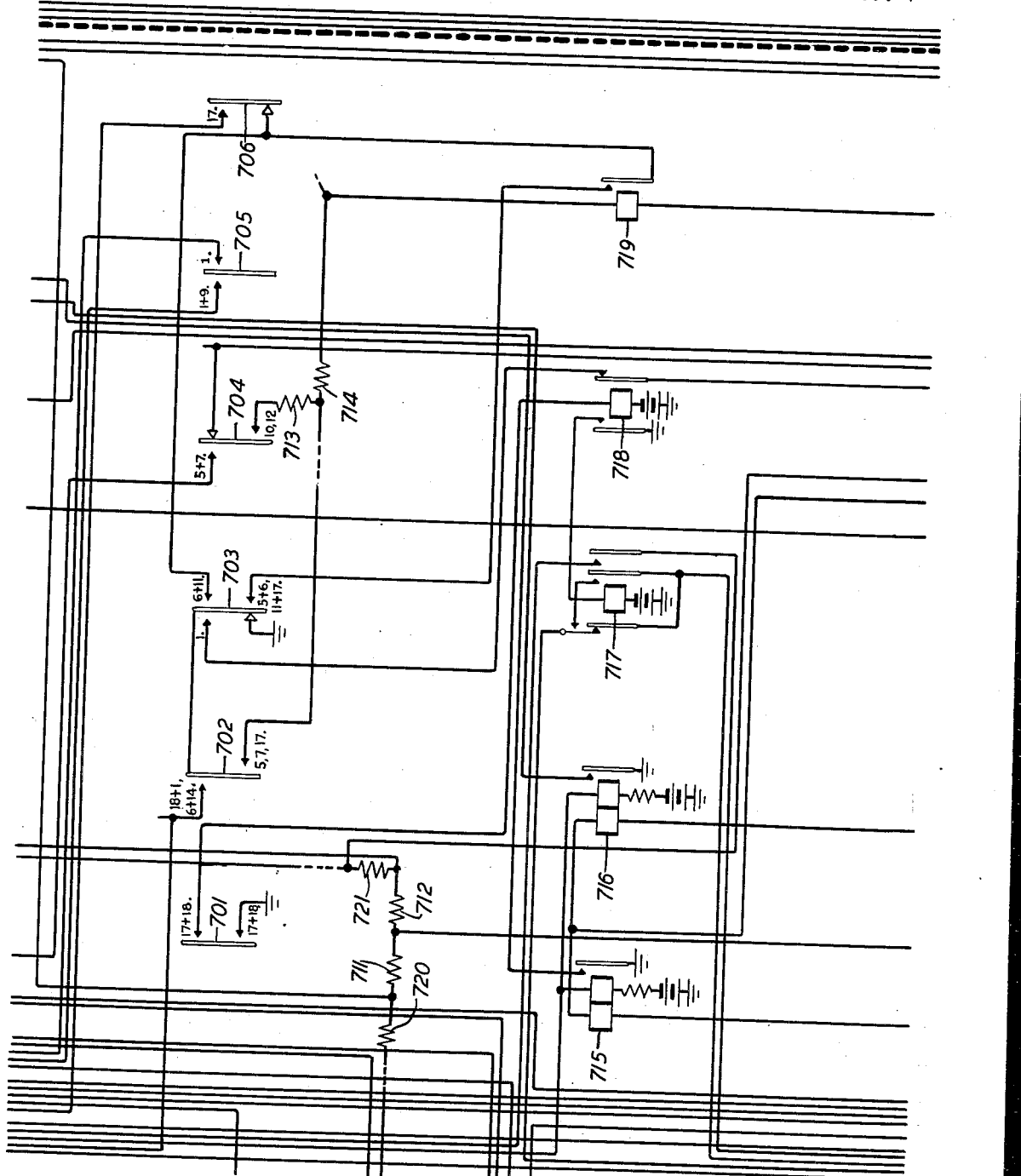
Figure 8:
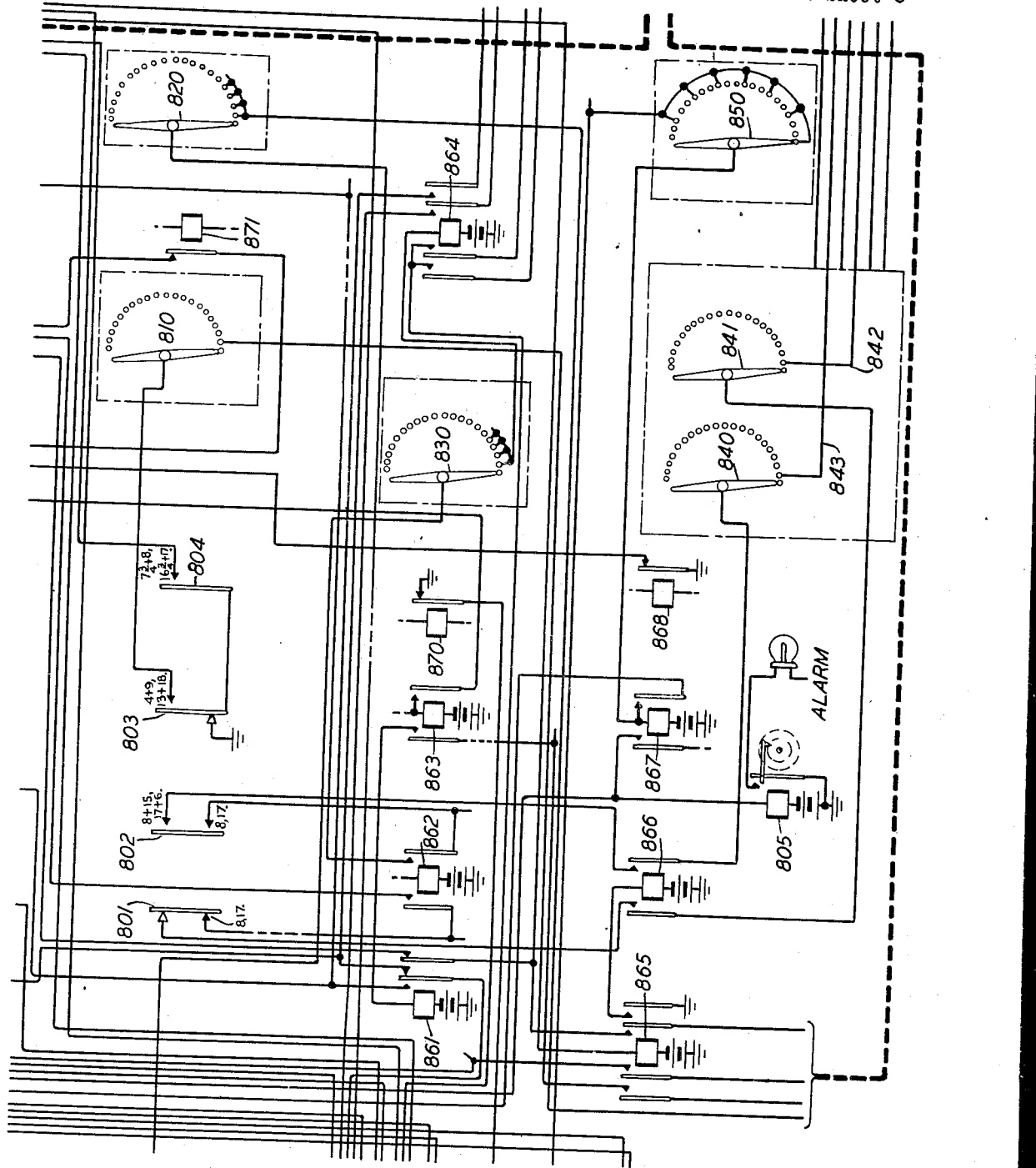

As soon as the master selector is positioned a circuit is closed from ground over connector sequence switch cam 803, brush 810, winding of relay 865 to battery to connect the test circuit with the line finder test line on the frame served by the line finder under test. Relay 865 also operates relay 866 which closes a link in the fundamental circuit. When the district selector has been found idle and has been seized, the connector sequence switch of Fig. 8 is advanced to position 8 and relay 862 is operated to extend the fundamental circuit to the control of the sender sequence switch of Fig. 7. When the line finder test line is found relay 863 is operated, closing a circuit for relay 861 to the sleeve of the line finder test line which is connected to ground over the sleeve brush of the line finder, left back contact of relay 1506, resistance 1434, inner lower back contact of relay 1428, and the lower contacts of cam 1409.

Figure 6:
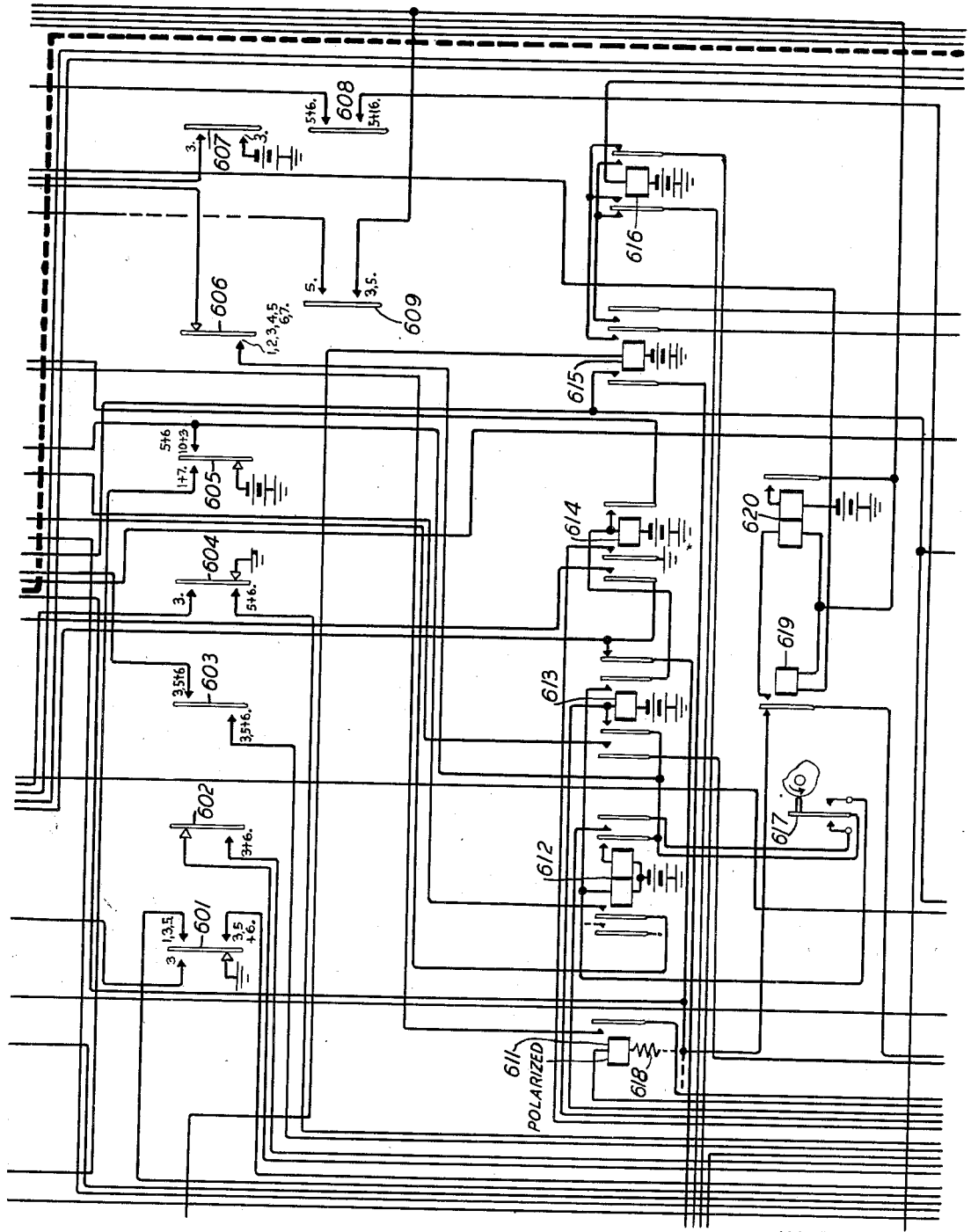

Assuming that the fifth zone key 115 has been operated, when the test class sequence switch of Fig. 6 reaches position 3 a circuit is closed from ground over the lower contacts of cam 601, right contacts of cam 403, conductor 415 to the winding of relay 314 and in parallel therewith over the inner left contact of key 115 to the winding of relay 136. Relays 136 and 314 operate, relay 136 in turn operating relay 313. With relay 136 operated, during the time that the district selector is being operated to select the district selector test line, which takes place in positions 5 to 7 of the sender sequence switch of Fig. 7 and positions 4 to 6 of the district selector sequence switch 1400, a circuit is closed for operating the zone relays of the district selector from battery through low resistance 139, outer left contact of relay 136, upper contacts of cam 704, left contact of relay 862, contacts of cam 801, left contact of relay 866, brush 841, conductor 842, right contacts of cam 1406, right winding of relay 1625, left winding of relay 1626 to ground. Both relays 1625 and 1626 operate in this circuit and lock to ground over the lower contacts of cam 1409.

With the district selector sequence switch in position 12 and the sender sequence switch in position 17, a circuit is closed for making talking selection in the usual manner. This circuit may be traced from ground over the lower contact of cam 702, resistance 714, winding of stepping relay 719, right contact of relay 862, contact of cam 802, right contact of relay 866, brush 840, conductor 843, lower left contact of cam 1417, lower right contact of cam 1416, right winding of relay 1507 to battery. Relay 1507 locks over its inner right contact and the upper left contact of cam 1416 to the circuit above traced and closes a circuit from battery through the winding of sequence switch magnet 1400, lower right contact of cam 1420, left front contact of relay 1507, upper left and lower right contacts of cam 1614, right back contact of relay 1505, lower right contact of cam 1410 to ground, advancing sequence switch 1400 out of position 12. As the sequence switch passes through positions 12⅔, 13⅜ etc., ground is connected over the left contacts of cam 1407 to the locking circuit of relay 1507, holding that relay operated and shunting the stepping relay 719 in the well known manner. Relay 719, when operated in series with relay 1507, closes a circuit from ground over the lower contacts of cam 703, front contact of relay 719, contact of cam 706, contacts of cam 602, front contacts of relay 314 and relay 313 to the winding of the No. 1 counting relay (not shown). Two shunting impulses are therefore necessary to satisfy the talking selection condition and the district selector comes to rest in position 14, while the sender sequence switch is advanced to position 18. In positions 17 and 18 relays 718 and 717 are operated in local circuits. The fifth zone key 115 therefore causes sequence switch 1400 to be set in position 14 to complete the zone indication.

When the district selector has been positioned, the test sequence switch 500 tests the continuity of the test line and prepares for further tests. In position 4 of the test sequence switch a circuit is closed from battery over the right contact of cam 605, winding of relay 521, upper left and lower right contacts of cam 503, upper left contact of cam 604 to ground. Relay 521 locks over the left contacts of cam 503 through positions 4 and 5 to ground at its inner right contact. In positions 4 and 5 the calling supervisory relay 1429 is held operated in a circuit from ground through the upper left winding of repeating coil 1430, upper contacts of cam 1401, upper back contacts of relays 1428 and 1427, tip brush of the line finder 1303 and tip conductor of the line finder test line, inner right contact of relay 865, left contacts of cam 504, resistances 721, 712 and 711, contacts of cam 512, back contacts of relays 613 and 619, inner left contact of relay 865, ring of the line finder test line and ring brush of line finder 1303, lower back contacts of relays 1427 and 1428, winding of relay 1429, upper contacts of cam 1403, lower left winding of repeating coil 1430 to battery. At the same time, a busy back signal is transmitted to the called supervisory relay 1431, the circuit extending from ground over the left contacts of cam 601, upper right and lower left contacts of cam 510, tip of the district selector test line and tip brush of district selector 1320, upper contacts of cam 1402, upper right winding of repeating coil 1430, winding of relay 1431, lower right winding of repeating coil 1430, upper contacts of cam 1404, ring brush of district selector 1320 and ring of the district selector test line, lower left and upper right contacts of cam 509, interrupter 513, outer right front contact of relay 521, resistance 522, right winding of relay 528, contacts of cam 607 to battery. Relay 523 operates in this circuit and locks through its left winding, back contacts of relays 525 and 524 to ground over cams 505, 506 and 804.

This busy back operation is continued during an eight-second time interval as measured by relays 411, 412, 413 and interrupter 414. If the front contact of relay 1431 sticks during this time, premature charge will be made. The operation of the timing relays is briefly as follows: With the sender sequence switch in position 17 or 18, relays 718 and 717 are operated and with the test class sequence switch in position 3, ground is connected over the upper right contact of cam 601, outer right contact of relay 717, the back contacts of relays 412 and 413 to interrupter 414. When the test sequence switch reaches position 4 battery is connected over cams 605 and 501, to the winding of relay 411, right back contacts of relays 412 and 413, front contacts of relay 717 to the right contact of the interrupter 414. The next closure of this contact operates relay 411 which locks through the winding of relay 412 to ground over cams 505, 506 and 804. Relay 412 operates when the interrupter opens its contact. With relay 412 operated, ground is disconnected from interrupter 414 and battery is connected thereto from cam 605 and the second closure of the right contact of interrupter 414 connects battery to the right front contacts of relay 412 holding that relay operated and shunting relay 411. With relay 411 released a new holding circuit for relay 412 is closed through the winding of relay 413 but relay 413 does not operate until the interrupter opens its contacts to remove battery from the inner right contacts of relay 412. Relay 413 locks through resistance 418 to ground over cams 505, 506 and 804. With relay 413 operated, the interrupter receives ground over the back contact of relay 870.

When the interrupter closes its right contact for the third time relay 412 is shunted and released. At the following closure of the left contact of interrupter 414 relay 411 is reoperated closing a locking circuit for itself through the winding of relay 412 as before. Relay 412 operates when the interrupter opens its contact. With relays 411, 412 and 413 operated a circuit is closed from battery through the winding of sequence switch magnet 500, lower right contact of cam 511, front contacts of relays 413, 412 and 411, front contact of relay 528 to ground at the left contacts of cam 601, advancing the test sequence switch to position 5. In passing from position 4 to position 5 the locking circuit for relays 411 to 413 is opened at the upper left contact of cam 505 and these relays release. In position 5 the same cycle of operations is performed, advancing sequence switch 500 to position 6 in which position the metering operations of the selector are tested.

When the test class sequence switch was set in position 3 with the district class sequence switch in position 17, relay 615 was operated over the upper left and lower right contacts of cam 403, lower contacts of cam 601 to ground, and in parallel with relay 615 a circuit extended over group selector brush 830 to the winding of relay 864. Assuming that key 222 is operated to test for overtime charge, a circuit is also closed in parallel with the winding of relay 615 over the back contact of relay 205 and key 222 through the winding of relay 212 to battery.

Relay 864 connects the left windings of relays 716 and 715 to contacts of the first and second party multi-contact relays 1201 and 1202, respectively, so that they are ready to operate whenever metering current is applied. Relay 615 connects the front contact of relay 715 over the left back contact of relay 616 to the winding of relay 216 and the front contact of relay 716 over the right back contact of relay 616, back contacts of relays 206, 214, and 311 to the winding of relay 215 so that premature metering would operate one of these relays and block the test. Operation of relay 215 indicates the reception of metering current at the wrong time, while operation of relay 216 indicates that the wrong party relays have been operated so that metering current would have been applied to the wrong party meter. Relay 216 if operated locks over conductor 416, contacts of cams 401, 603, 505, 506 and 804 to ground, lights lamp 221, operates the trouble meter 805 and blocks the test by opening the circuit of magnet 307. Relay 215, if operated, locks to ground over the front contact of relay 615 and contacts of cams 505, 506 and 804 and lights lamp 220. It also sounds the alarm and blocks the test by opening the circuit of magnet 307.

When the test sequence switch 500 reaches position 6 a circuit is closed from ground over cam 804, lower left contact of cam 505, contacts of cams 603 and 401, conductor 416, winding of relay 316 to battery. A circuit is also closed from ground through the winding of relay 524, upper right and lower left contacts of cam 501 to battery over the left contacts of cam 605. Relay 524 substitutes battery over its inner right contact for battery through the winding of relay 528. It also prepares a circuit from battery over its left contact through the winding of relay 525, outer right front contact of relay 524, right contacts of cam 503, to ground at the inner right contact of relay 521.

When sequence switch 500 advanced from position 5 the locking circuit of relay 521 was opened and relay 521 released. At the beginning of this test, a test is made of the ability of the district selector to hold over short openings of the line circuit and at the same time relay 1431 is subjected to heavy current flow in the non-operating direction. The circuit of the calling supervisory relay 1429 extends at the time that sequence switch 500 reaches position 6 over the path previously traced, while the circuit of the called supervisory relay 1431 is open.

As soon as sequence switch 500 reaches position 6 ground is connected over cams 508 and 606 to interrupter 617. When this interrupter closes its right contact it operates relay 612 which locks to ground over cams 606 and 508. Relay 612, over a circuit not shown, advances the sender sequence switch to position 1. A circuit is then closed from battery through the winding of relay 613, contacts of cam 705, outer right contact of relay 612, left contact of interrupter 617 to ground, operating relay 613 which also locks to ground over cams 606 and 508. When the interrupter next closes its right contact relay 614 is operated over the front contact of relay 613 and locks to ground over the right contact of cam 507.

When relay 612 operated it closed the non-operative circuit for relay 1431 which extends from battery over the right contact of cam 605, left front contact of relay 612, resistance 527, left back contact of relay 521, lower contacts of cam 510, over the tip of the district selector test line through relay 1431 as previously traced to the ring of the test line, lower contacts of cam 509, right back contact of relay 521 to ground over cams 506 and 804. When relay 613 operated it opened the holding circuit above traced for relay 1429, which was in shunt of resistances 720 and 618 and the winding of relay 611. These resistances are sufficiently high to release relay 1429. When relay 614 operates the holding circuit for relay 1429 extends as previously traced from the tip conductor to cam 512 and thence over the front contact of relay 614, contacts of cam 514, to the ring conductor, again shunting resistances 618 and 720 and relay 611.

Relay 614, in operating, closes a circuit from ground at its inner left contact, right front contact of relay 316, inner right back contact of relay 318, winding of relay 213 to battery. To initiate the operation of the timing switch, relay 213 closes a circuit from battery through the winding of magnet 307 of the primary timing switch 300, back contacts of relays 201, 216, 214, 215, 206 and 210, inner right front contact of relay 213, inner left back contact of relay 212 to ground over interrupter 211.

Interrupter 211 which is common to the office, is driven by the same mechanism as interrupter 1208 which controls the timing function of the district selector so as to be in synchonism with it, but closes its contact once every six seconds. When the interrupter closes its contact magnet 307 operates and when the contact opens advances switch 300 to position 1. In this position a circuit is closed from battery through the winding of relay 311, left contacts of cam 406, normal contact of brush 101 of the secondary timing switch 100, and in parallel therewith from battery through the winding of relay 315, brush 305 in position 1, outer right back contact of relay 210, outer left front contact of relay 212 to ground at the inner right contact of relay 213. Relay 315 locks to ground over the front contact of relay 615 and the right contact of cam 505. Relay 311 disconnects the front contact of relay 716 from the winding of relay 215 and connects it to the winding of relay 312 to receive the metering impulses.

Relay 315 closes a circuit from ground at its outer right contact, left front contact of relay 316, left contacts of cam 503, winding of relay 521, right contact of cam 605 to battery. Relay 521 reoperates in this circuit and locks as before, transferring the circuit of relay 1431 to battery and ground in a direction to operate that relay. The tip of the test line now extends over the outer left front contact of relay 521 through resistance 526 to ground over the left contact of cam 702 and the ring of the test line extends over the right front contact of relay 521, resistance 522, to battery at the inner right contact of relay 524. It is therefore apparent that the advance of switch 300 to start the timing causes the operation of relay 1431.

In the district selector, the operation of relay 1431 connects ground from the right contacts of cam 1409 over the front contact of relay 1431, upper contacts of cam 1414, right contacts of cam 1603 to interrupter 1514. When the interrupter closes its right contact, it extends this ground over the right contacts of cam 1606 through the right winding of relay 1508 to battery. Relay 1508 closes a locking circuit for itself over its outer right contact to the same ground. When the interrupter closes its left contact, two seconds later, ground from the front contact of relay 1431 is extended over the inner right contact of relay 1508, lower contacts of cam 1423, right contacts of cam 1602, lower left contact of cam 1622 to battery through the winding of sequence switch magnet 1600. The district selector timing sequence switch 1600 is therefore advanced to position 2, disconnecting ground from interrupter 1514 and releasing relay 1508.

With sequence switch 1600 in position 2 a circuit is closed for relay 1501 over the left contacts of cam 1606, upper left contact of cam 1411 to ground. Relay 1501 extends its operating circuit to the winding of relay 1502 which locks over its inner left contact to ground at the upper left contact of cam 1409, holding relay 1501 operated.

With sequence switch 1600 in position 2, the district selector prepares to seize the message register connector circuit. For this purpose a circuit is closed from ground over the front contact of relay 1431, upper contacts of cam 1414, upper contacts of cam 1603, right winding of relay 1624 to conductor 1627. In the connector circuit this conductor extends, if the circuit is idle, over the right back contact of relay 1114, left back contact of relay 1016, upper back contact of relay 912, winding of relay 1115, left back contact of relay 1015 to battery. If the connector is busy, this circuit is opened at one or more points and the district selector waits until it becomes idle. When this occurs relay 1624 operates and prepares a locking circuit for itself from battery through its left winding, upper left and lower right contacts of cam 1617, right front contact of relay 1624, left back contact of relay 1114, winding of relay 1015, lower back contact of relay 912 to ground. A preference circuit over the contacts of relays similar to relay 1624 in other district selectors gives them access to the connector in a given order, if more than one attempt to seize the connector at the same time. When relay 1624 locks, relay 1015 operates in turn operating relays 1014 and 1016. Relay 1623 also operates in parallel with the locking circuit of relay 1624 and operates relay 1512.

With relay 1512 operated the first party relay of the connector circuit is operated over a circuit which may be traced from battery through the windings of relays 1009 and 1001, conductor 1515, inner right contact of relay 1512, right back contact of relay 1511, outer right contact of relay 1512, right contacts of cam 1412, commutator strip 1315, brush 1312 to ground. Relay 1001 in turn operates relay 1201 and a plurality of similar multi-contact relays in order to connect the first party meters to the metering terminals of the corresponding lines in the frame served by the connector circuit and district selector. Relay 1201 in turn operates relay 1203, two multi-contact relays being employed to supply sufficient contacts. Relay 1201 also connects the metering terminal of the test line with the test circuit relay.

The operation of relay 1628 also connects the meter control conductors from the district selector to the connector. In position 2 these conductors are tested for continuity by connecting ground to all relays which might be used.

Since relays 1625 and 1626 were both operated ground is connected to conductors 1631 and 1632 over the front contacts of these relays. Ground is connected to conductor 1634 over the middle right contact of relay 1628, lower contacts of cam 1602, lower contacts of cam 1423, outer left front contact of relay 1502, lower left and upper right contacts of cam 1603, upper contacts of cam 1414 to ground over the front contact of relay 1431, since sequence switch 1400 is in talking position 14. Had talking position 13 been selected ground would have been connected to conductor 1633 instead of to conductor 1634, over the outer left contact of relay 1628, lower left and upper right contacts of cam 1618, outer right contact of relay 1625, lower right contact of cam 1422, lower left contact of cam 1423, thence as traced to ground over the front contact of relay 1431 and with either relay 1625 or 1626 unoperated ground is supplied to conductor 1631 or 1632, respectively, over the back contact of the relays, upper left and lower right contacts of cam 1604 in position 2 only from the left front contact of relay 1624. Ground is also connected to conductor 1635 over the middle left front contact of relay 1628, lower contacts of cam 1611, back contact of relay 1505 to ground over the lower right contact of cam 1410. Ground connected to conductors 1631, 1632, 1634 and 1635 causes the operation of relays 1120, 1119, 1117, 1116 and 1010. With all of these relays operated, a circuit is closed from ground at the outer right contact of relay 1117, inner left contacts of relays 1119 and 1120, left contact of relay 1010, inner left contact of relay 1006, winding of relay 1011 to battery. Relay 1011 locks through the winding of relay 1006, left front contact of relay 1011 to ground at the front contact of relay 1015, but relay 1006 does not operate at this time being shunted by the operating circuit of relay 1011. The operation of relay 1011 closes a circuit from ground at the right back contact of relay 1006, right front contact of relay 1011, back contact of relay 1005, conductor 1518, left front contact of relay 1512, upper right and lower left contacts of cam 1613, lower contacts of cam 1612, winding of relay 1623, upper contacts of cam 1601, winding of relay 1509, right contacts of cam 1616, resistance 1629 to battery. Relay 1509 is ineffective at this time but relay 1623 in operating closes a circuit from ground over its right front contact, upper right and lower left contacts of cam 1615 to battery through the winding of sequence switch magnet 1600, advancing the sequence switch out of position 2. When the sequence switch leaves position 2 battery is disconnected from the winding of relay 1623 and that relay releases bringing sequence switch 1600 to rest in position 3. Sequence switch 1600 is advanced from position 3 in a circuit over the upper left contact of cam 1622 to ground at the left front contact of relay 1624. The advance from position 2 also disconnects ground from conductor 1632 at cam 1607 and from conductor 1635 at cam 1611. This permits relays 1010 and 1119 to release, removing the shunt from the winding of relay 1006 and permitting that relay to operate, disconnecting ground from the circuit of relay 1623.

With relay 1006 operated a circuit is closed from ground at the right back contact of relay 1103, left front contact of relay 1006 to conductor 1632, which is extended in position 4 of sequence switch 1600 over the lower contacts of cam 1607, lower right contact of cam 1622, to the winding of sequence switch magnet 1600, advancing the sequence switch to position 5 in which position metering takes place.

Figure 9:
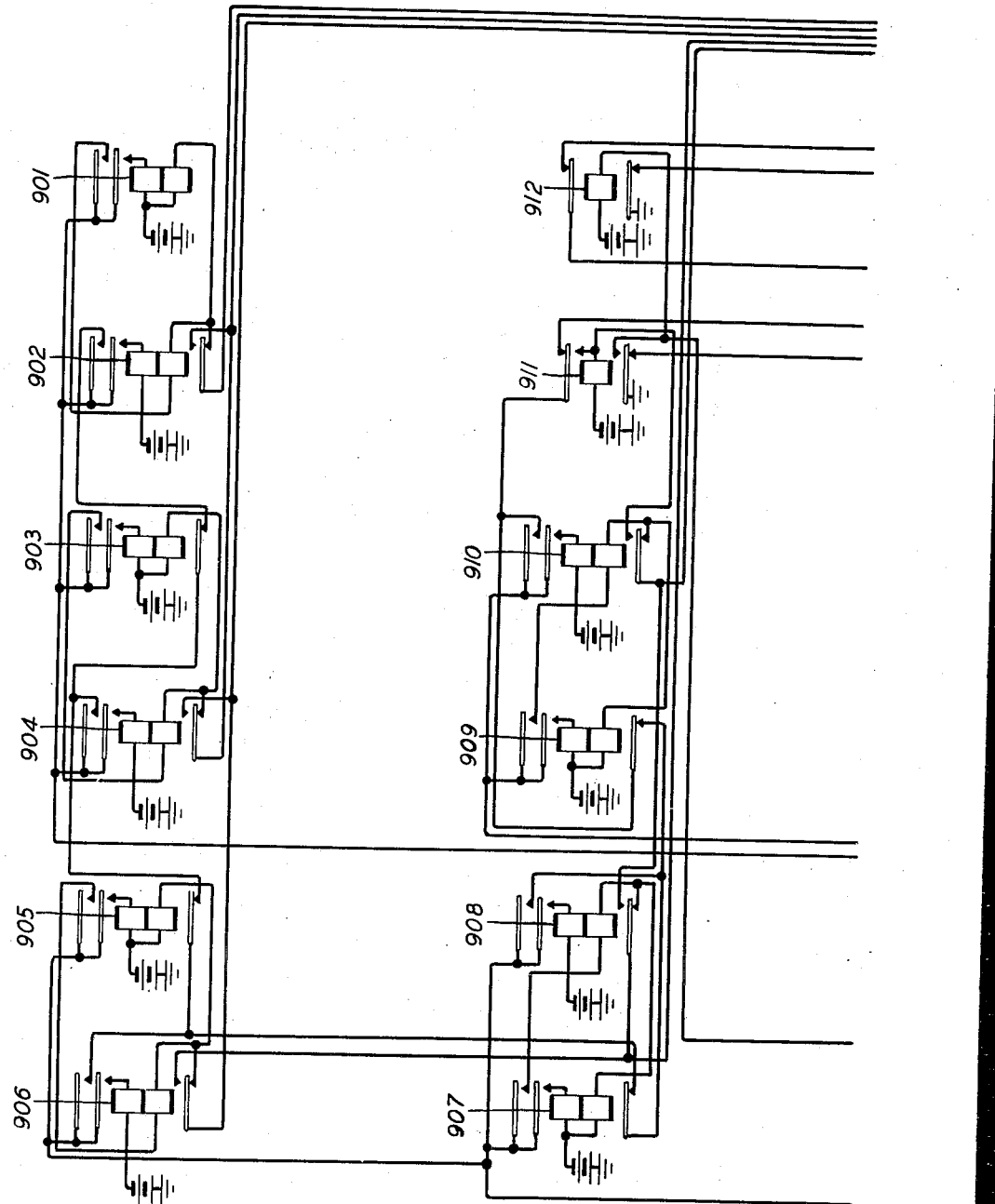
Figs. 9 to 12 show the message register connector circuit.
Figure 10:
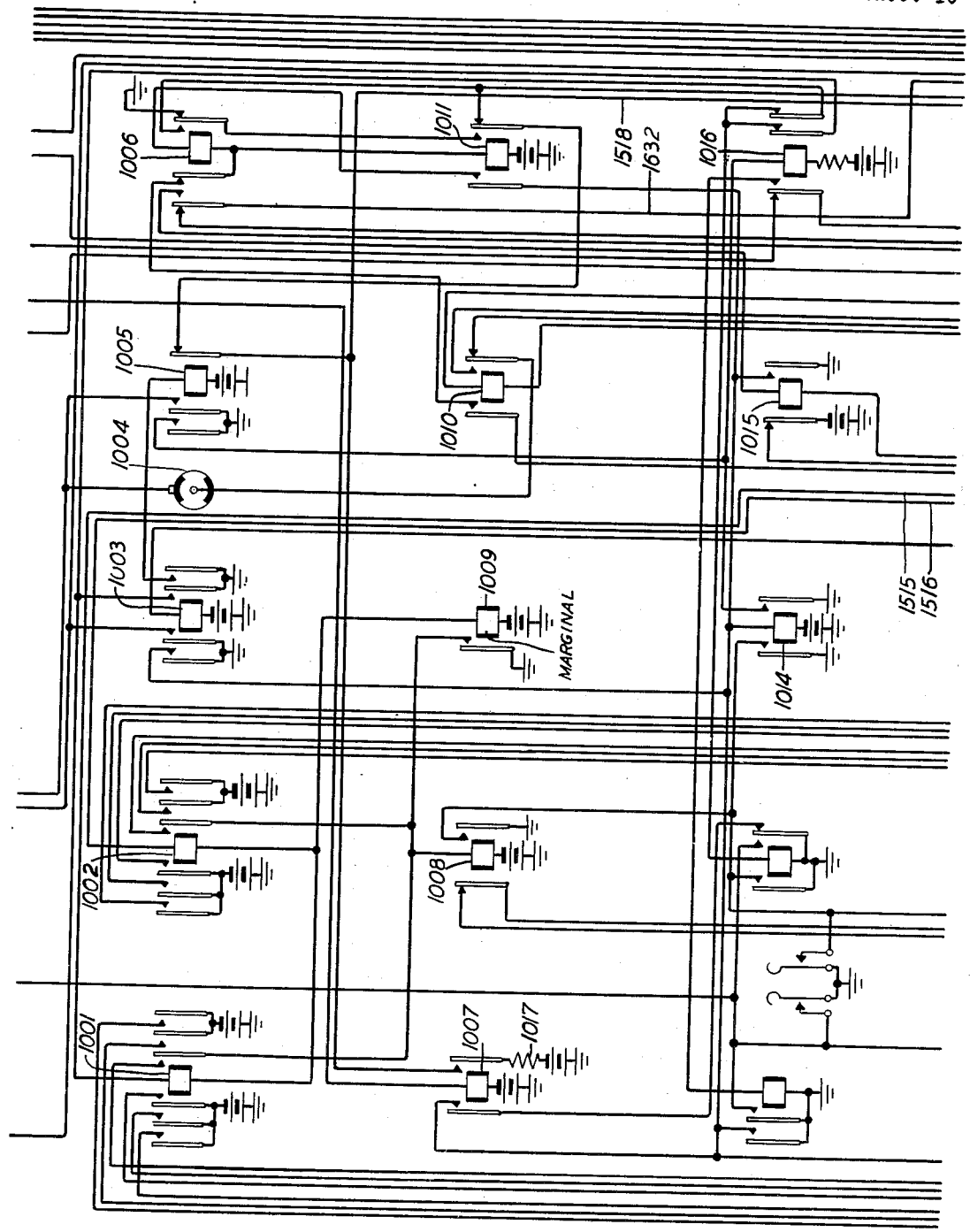
Figure 11:
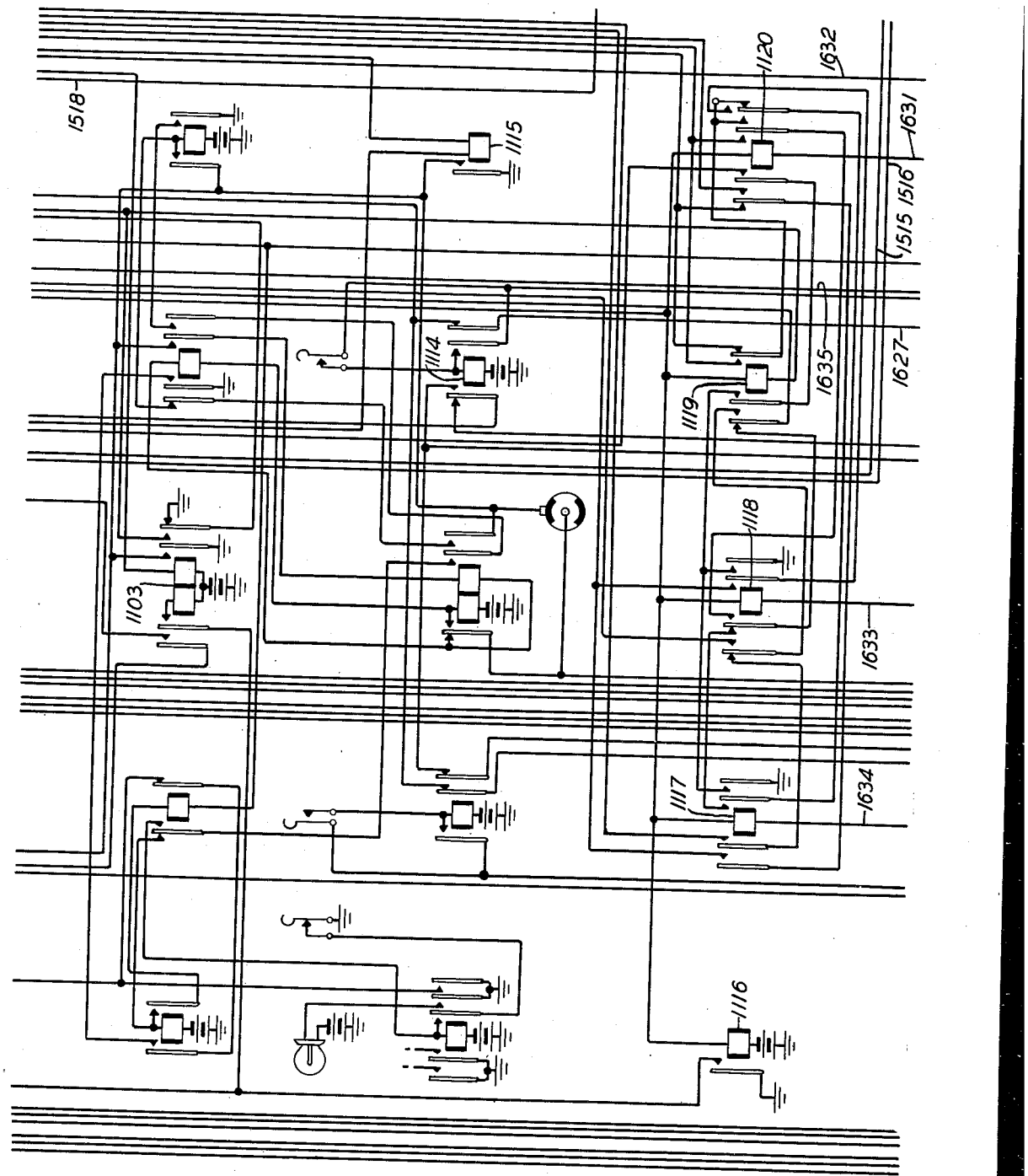
Figure 12:
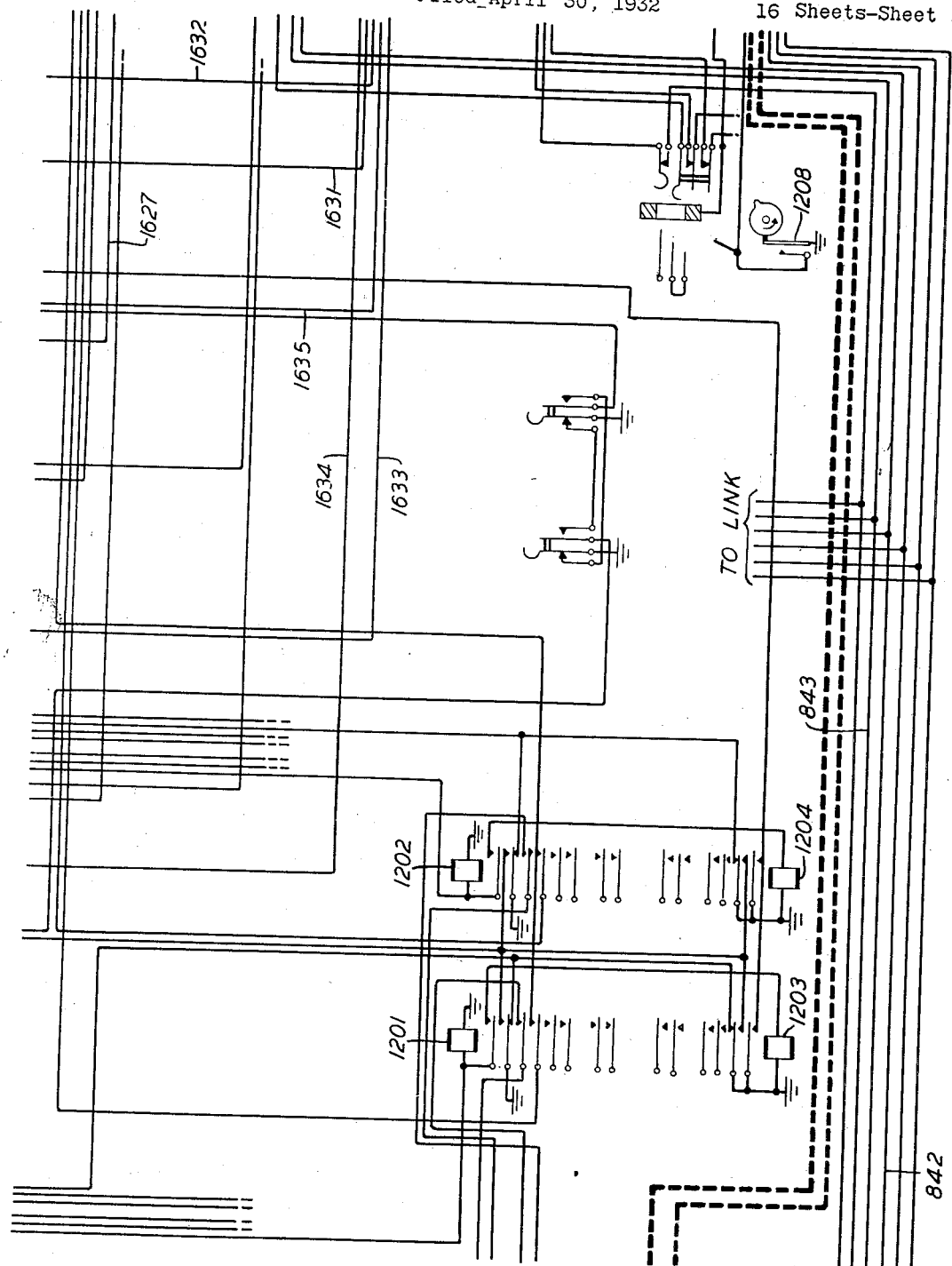
Figure 13A:
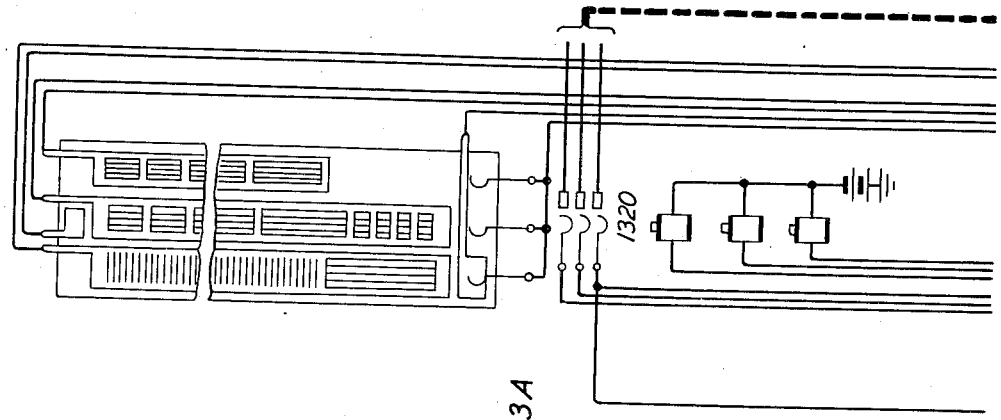
Figure 17:
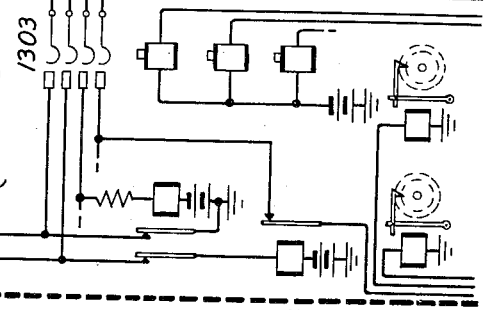
Figure 13:
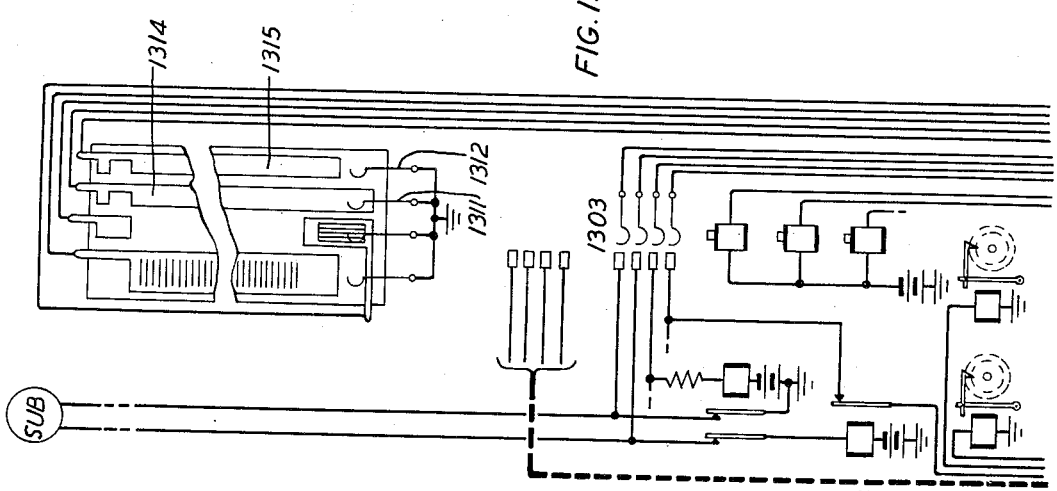
Figure 14:
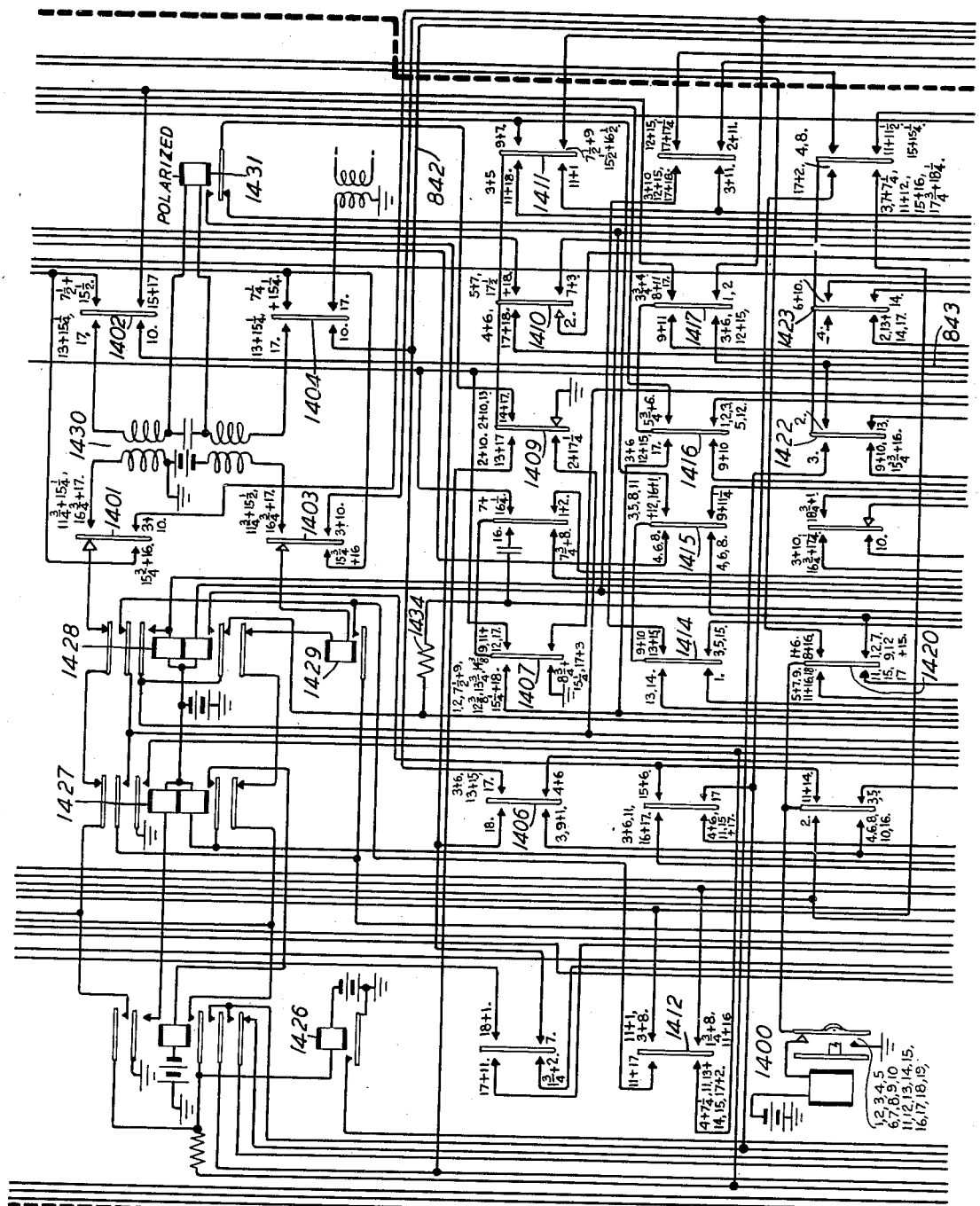
Figure 15:
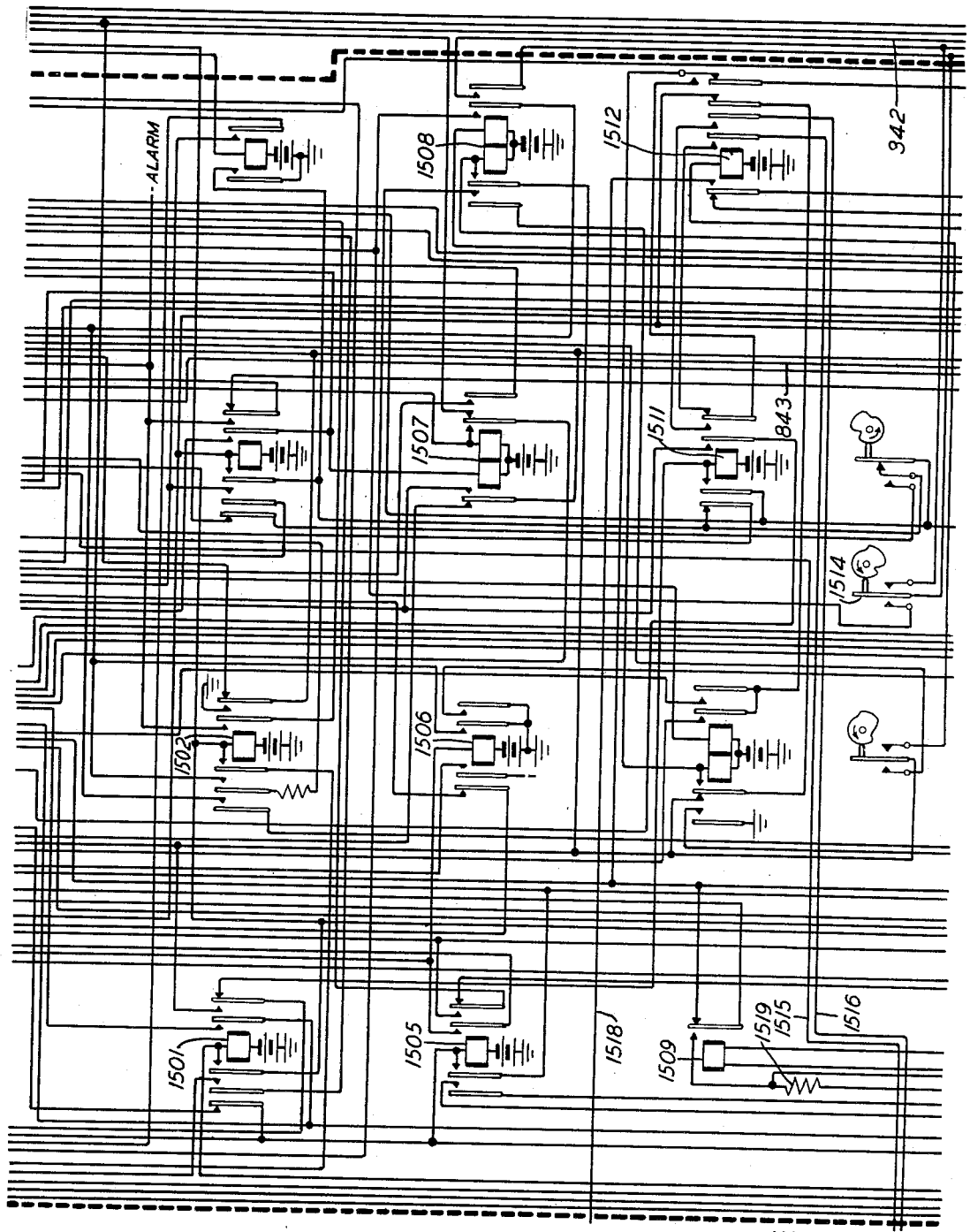

When sequence switch 1600 reaches position 5 a circuit is closed from battery through the right winding of relay 1103, right front contact of relay 1006, right front contact of relay 1011, back contact of relay 1005, conductor 1518, left front contact of relay 1512, right contacts of cam 1613, metering brush of line finder 1303, metering terminal of the line finder test line, group selector brush 820, lower contacts of cam 404, inner left contact of relay 864, front contacts of the first party multi-contact relay 1201, outer right contact of relay 864, left winding of relay 716, back contact of relay 868 to ground. The operating circuit for relay 1103 therefore is a test of the connection of the meter or the meter testing relay to the metering terminal. Relay 1103 locks through its left winding and inner left contact to ground at the front contact of relay 1015. It also closes a circuit from ground at the front contact of relays 1201 and 1203, back contact of relay 1008, outer left contact of relay 1103, winding of relay 1003 to battery. Relay 1003 operates relay 1005, supplies locking ground for the relays of Fig. 9 and supplies an additional locking ground for relay 1103. Relay 1005 connects ground to interrupter 1004 and supplies an additional holding ground for relay 1016. The operation of relay 1103 disconnects ground from conductor 1632 and extends it back to the winding of relay 1119.

With sequence switch 1600 in position 5, relays 1117 and 1120 are still operated and relay 1119 is reoperated. Therefore, when interrupter 1004 closes its contact, a circuit is extended over the back contact of relay 1010, left front contact of relay 1119, left back contact of relay 1118, inner left contact of relay 1117, lower back contact of relay 902 to the lower winding of relay 901 and battery. Relay 901 locks in a circuit through its upper winding and inner upper contact to ground at the front contact of relay 1003. It also closes a circuit from battery through its lower winding, lower winding of relay 902, outer upper contact of relay 901 to ground at the front contact of relay 1003. Relay 902 is shunted by the operating circuit of relay 901 until interrupter 1004 opens its contact. Relay 902 then operates, locking in a circuit from battery through its upper winding and inner upper front contact to the contact of relay 1003. Relay 902 in operating extends ground the circuit controlled by interrupter 1004 over the back contact of relay 904 to the winding of relay 903 and also extends ground from the contact of relay 1003, outer upper front contact of relay 902, back contacts of relays 903, 905, 907, 909 and 911 to the winding of relay 1007. Relay 1007 connects battery over its front contact to the left front contact of relay 1512 and thence over the circuit above traced over the metering terminal of the line finder and test line to the winding of relay 716 and ground. Relays 903 to 910 are operated in a manner similar to relays 901 and 902, the odd relays such as relay 903 opening the circuit of relay 1007 and causing the disconnection of metering potential and the even relays, such as relay 904, reoperating relay 1007 so that when relay 910 operates five applications of metering potential have been made. Relay 911 operates on the sixth closure of interrupter 1004 opening the circuit of relay 1007 and operating relay 912 directly. Relay 912 disconnects ground from the windings of relays 1015, 1624 and 1628 thereby releasing these relays. Relay 912 also opens the initial operating circuit of relay 1624 to prevent premature reseizure of the connector circuit. The release of relay 1015 opens one locking circuit of relay 1103, while the release of relay 1628 releases the zone relays 1116 to 1120 thereby opening the locking circuit at another point. The release of relay 1628 also releases relay 1512, in turn releasing relays 1001 and 1201 thereby releasing relay 1003 and opening the final holding circuit for relay 1103. When relay 1003 releases the connector circuit is completely restored to normal.

The release of relay 1624 advances sequence switch 1600 to position 7 over the upper right contact of cam 1622. In position 7 a circuit is closed from battery through resistance 1629, right contacts of cam 1616, winding of relay 1509, back contact of relay 1623, left contacts of cam 1609 to ground over interrupter 1208. This interrupter is common to all the district selectors in the office and closes its contacts once every thirty seconds. When the interrupter closes, relay 1509 operates closing a locking circuit for itself through its winding, upper contacts of cam 1601, winding of relay 1623, lower left and upper right contacts of cam 1612, front contact of relay 1509, commutator segment 1314, brush 1311 to ground. When the interrupter opens its contacts relay 1623 operates in this locking circuit, closing a circuit from ground at its right front contact, upper left and lower right contacts of cam 1615, winding of sequence switch magnet 1600 to battery. Sequence switch 1600 advances from position 7, disconnecting battery from the windings of relays 1509 and 1623 at the contacts of cam 1616. These relays therefore release and stop sequence switch 1600 in position 8. This advance marks the beginning of the five-minute initial talking period. In a similar manner sequence switch 1600 is advanced from position to position, reaching position 18 in response to ten closures of interrupter 1208 and measuring an interval of five minutes.

When sequence switch 1600 reaches position 16, if sequence switch 1400 is still in a talking position, relay 1505 operates over the upper contacts of cam 1608 to ground over the upper left contact of cam 1411 and locks through its inner left contact, lower left and upper right contacts of cam 1412, the off-normal commutator strip 1315 and brush 1312 to ground and therefore relay 1505 remains operated as long as the line finder is off-normal.

With sequence switch 1600 in position 18 a circuit is closed from battery through resistance 1629, lower contacts of cam 1616, resistance 1519, upper right and lower left contacts of cam 1612, winding of relay 1623, upper right and lower left contacts of cam 1601, front contact of relay 1429 (indicating that the selector is still held over the line finder test line) upper contacts of cam 1412 to ground over the off-normal commutator strip 1315. With relays 1623 and 1505 operated, a circuit is closed from battery through the winding of sequence switch magnet 1600, lower right contact of cam 1622, right contacts of cam 1605, outer left contact of relay 1505, left contact of relay 1623, lower contacts of cam 1621 to ground, advancing sequence switch 1600 to position 1.

With sequence switch 1600 in position 1 and the talking closure maintained, relay 1431 remains operated and interrupter 1514 and relay 1508 function as previously described to advance sequence switch 1600 to position 2. The message register connector circuit is again seized and the control conductors tested in the manner previously described. However, since relay 1505 is now operated the circuit of relay 1010 extends over conductor 1635, middle left contact of relay 1628, lower right and upper left contacts of cam 1611, outer right front contact of relay 1505 to ground at the lower right contact of cam 1410 so that it remains operated when sequence switch 1600 advances to position 5.

With relay 1010 operated the charge counting circuit controlled by interrupter 1004 extends over the front contact of relay 1010, outer left front contact of relay 1117, middle right front contact of relay 1120, right front contact of relay 1119, over the back contact of relay 908, to the winding of relay 907 so that only two impulses will be transmitted.

With relay 1505 operated to indicate that an overtime period is being timed relay 1600 is advanced to position 8 in the usual manner. Overtime periods are usually shorter than the initial talking period so that means is provided under the control of the zone registration relays and talking position to advance the timing sequence switch through certain positions. With relays 1625 and 1626 operated and sequence switch 1400 in position 14 to indicate a call to zone 5, the overtime period is one minute and the timing sequence switch 1600 is advanced in the following manner. It is advanced from position 8 to position 12 over the lower right contact of cam 1622, inner right contact of relay 1625, lower contacts of cam 1604, outer left contact of relay 1505, lower contacts of cam 1619, upper left contacts of cam 1620, to ground. In positions 12 and 13 this circuit is extended from the front contact of relay 1505 over the upper left and lower right contacts of cam 1602, lower contacts of cam 1423, outer left contact of relay 1502, lower left contact of relay 1620 to ground advancing sequence switch 1600 to position 14. It is then advanced from position 14 to position 16 in a circuit extending as above traced to the front contact of relay 1505 and thence over the lower left and upper right contacts of cam 1619, inner left contact of relay 1626, right contact of cam 1620 to ground. It is then advanced from position 16 to position 18 under the control of interrupter 1208 to measure a time interval of a single minute after which it will seize the connector circuit and apply the same two overtime metering impulses as before.

Returning to the consideration of the testing circuit, the primary timing switch 300 is advanced under the control of interrupter 417 from position 1 to position 6 measuring an interval of thirty seconds during which the district selector should seize the connector circuit and the metering impulses should be transmitted.

When relay 716 operates in response to the metering impulses, it operates relay 312 and relay 312 connects ground over its right contact, left contacts of cam 409, right back contact of relay 202, outer left contact of key 115, over the cross-connecting terminals, back contact of relay 129 and winding of counting relay 130. Relay 130 locks through the winding of relay 129 in the usual manner to ground at the inner right contact of relay 311 and when the metering current is withdrawn relay 129 also operates. If the five impulses are properly transmitted, relays 121 and 122 will be operated at the end of the last metering impulse and when brush 305 reaches position 5 a circuit will be closed from battery through the winding of magnet 107 of the secondary timing switch, inner right contact of relay 212, upper front contact of relay 121, back contact of relay 205, inner right back contact of relay 204, outer left front contact of relay 311, right back contact of relay 209, brush 305, in position 5, outer right back contact of relay 210, outer left front contact of relay 212 to ground at the right front contact of relay 213. When switch 300 is advanced to position 6 at the end of the interval of thirty seconds, magnet 107 releases, advancing switch 100 to position 1.

If too many metering impulses are received, the operation of relay 312 closes a circuit over the front contacts of relays 129, 127, 125, 123 and 121, through the winding of overcharge relay 201. This relay locks to grounded conductor 416, lights lamp 217, operates the trouble meter and the alarm 805 and opens the circuit of magnet 307, blocking the test. If not enough metering impulses are received, when brush 305 reaches position 5 relay 121 is not operated and a circuit extends over the upper back contact of relay 121 to the winding of the undercharge relay 214 which lights lamp 219, operates the meter 805, sounds the alarm and opens the circuit of magnet 307.

When magnet 107 operates and releases to step switch 100 to position 1, the circuit of relay 311 is opened and the circuit from the front contact of relay 716 is transferred back to the winding of relay 215 so that a much belated charge or a premature overtime charge would operate relay 215. Relay 215 is also operated if relay 1431 operates in the busy back or non-operating circuits to cause premature metering. If operated, relay 215 locks to ground over the front contact of relay 615, lights lamp 220, operates the trouble meter and alarm 805 and opens the circuit of magnet 307.

The release of relay 311 also opens the locking circuits for the counting relays and these relays release. With relay 311 released, the circuit of magnet 107 extends over the front contact of relay 212, back contact of relay 311, right back contact of relay 209 to the contacts of brush 305 in positions 5, 10, 15 and 20. Switch 300 continues to advance one step each six seconds under the control of interrupter 417 and at the end of each thirty-second interval advances switch 100 one step. When switch 300 reaches position 21 ground over brush 304 and the interrupter contact of magnet 307 steps the switch to normal and it is stepped from normal over brush 301, front contact of relay 315, to ground at the outer left contact of relay 213. It is therefore stepped from position 20 to position 1 without interruption of the timing operation.

At the expiration of five minutes, therefore, switch 100 should be in position 10. When brush 104 reaches position 9 a circuit is closed for relay 202 to prepare the circuit for testing overtime metering. Relay 202 locks to grounded conductor 416. In position 10 relay 311 operates over brush 101 to ground over the locking circuit of relay 315. The operation of relay 311 prepares relay 312 to receive the metering impulses. Likewise in position 10 of brush 104, a circuit is closed over the back contact of relay 203, outer back contact of relay 204, winding of relay 209 to battery. This relay prepares circuits for determining whether the overtime metering impulses are received at the proper time. Assuming that brush 305 was in position 10 when it closed the circuit of magnet 107 and in position 11 when brush 104 advanced to position 10, when brush 305 reaches position 13 a circuit is closed from ground as previously traced to brush 305, inner left front contact of relay 209, winding of relay 207 to battery. Relay 207 locks under the control of relay 209. Relay 209 also opens the circuit of magnet 107 to prevent its advance from position 10 when brush 305 passes position 15. If the metering pulses have not been received within thirty seconds from the operation of relay 207, brush 305 in position 18 closes a circuit over the outer left contact of relay 209 for relay 208 and with both relays 208 and 207 operated relay 206 is operated, opening the circuit of magnet 307 and arresting the operation of the testing circuit. Relay 206 also lights lamp 218 and operates the trouble meter 805. However, if the metering impulses are received, operating relay 312, the first closure of its left contact closes a circuit over the right front contact of relay 209 through the winding of relay 210. Relay 210 in turn closes a circuit from battery through the winding and interrupter contact of magnet 307, strapped terminals of brush 301, right front contact of relay 210, outer left front contact of relay 212, right front contact of relay 213, to ground. Switch 300 is immediately advanced to position 17 in this circuit, in which position relay 203 operates over the inner left front contact of relay 210 and brush 306. Relay 203 locks in position 10 of brush 102 and opens the circuit of relay 209 which in turn, releases relay 207, renders relays 208 and 206 ineffective, and restores the circuit of magnet 107.

Relay 312 at its right contact closes a circuit over the left contacts of cam 409, right front contact of relay 202, right front contacts of relay 136, over a second set of cross-connecting terminals and jumper wires, back contact of relay 123 to the winding of the No. 2 counting relay 124. Therefore, two metering impulses should be received to satisfy the condition set up by the operation of relay 136.

As before, if the proper number of impulses are received magnet 107 is operated in position 20 of brush 305, while if too many or too few impulses are received relays 201 or 214 are operated.

The advance of switch 100 from position 10 releases relay 311 and restores the metering circuit to the winding of relay 215. Since the overtime period is usually less than the initial period, cross-connections are provided at brush 106 for advancing the lower secondary timing switch through a number of positions. Cross-connections are also available should the initial talking period need to be reduced. When brush 106 reaches position 11, a circuit is closed from grounded conductor 415, over brush 106, inner right contact of key 115, winding of relay 140 to battery. Relay 140 locks over its inner contact to ground over the strapped contacts of brush 102 which extend through position 13. At its outer contact relay 140 extends ground from brush 102 to the interrupter contacts and winding of magnet 107 so that switch 100 is immediately advanced to position 19 where relay 140 is released.

In position 20 of timing switch 100, relay 317 operates over brush 106 and relay 311 is operated over brush 101 for the second overtime charge. If the second overtime charge is received before brush 306 reaches position 9, a circuit is closed from ground over the left front contact of relay 312, inner right contact of relay 317 to the winding of relay 318. If the impulses have not been received at the expiration of this time, a circuit is closed over brush 305, back contact of relay 318, outer right front contact of relay 317 to the winding of relay 206 which locks under the control of relay 317, lights lamp 218, sounds the alarm and blocks the call.

If relay 318 operates, it locks over its inner right contact, right front contact of relay 316 to ground at the front contact of relay 614. It also closes a circuit from battery through the winding of sequence switch magnet 500, left contact of cam 511, inner left front contact of relay 318, outer left contact of relay 613, inner left contact of relay 521, front contact of relay 525 to ground at the front contact of relay 521, advancing the test sequence switch 500 to make other tests which will not be described. The operation of relay 318 release relay 213 which advances switch 100 to normal and prepares a circuit for restoring switch 300 to normal when the test class switch advances.

For other zones, the registration sent to the district, the number of pulses received, and the length of the overtime period are different but can be easily ascertained from an inspection of the drawings. If the overtime feature is not to be tested, key 222 and therefore relay 212 are not operated. Consequently, switch 300 is under the control of the fast interrupter 211 and relay 318 is operated over the inner right back contact of relay 212 and the front contact of relay 121, when brush 303 reaches position 8.

Selectors which make overtime charges without zone registration are represented by positions 8 to 10 of the district class sequence switch of Fig. 4. In testing such selectors the circuit controlled by relay 312 extends over the upper left and lower right contacts of cam 409 directly to the back contact of relay 121 and the winding of relay 122 so that a single metering impulse completes the circuit for advancing switch 100.

Selectors which serve coin lines apply the coin current at the end of the talking period. These selectors are represented by position 7 of the district class sequence switch and in this position the tip of the line finder test line extends, when relay 315 operates, through resistance 712, contacts of cam 402, winding of relay 319, back contact of relay 318, inner left contact of relay 315 to ground. Relay 319 operates and connects ground over its right contact through the winding of relay 611 which is connected to the ring conductor of the line finder test line. The connection of coin battery to the ring conductor operates relay 611 which closes a circuit from ground over the left contact of cam 507, front contact of relay 611 and front contact of relay 319, back contact of relay 206, back contact of relay 214, front contact of relay 311 to the winding of relay 312 and battery. Relay 312 functions in the manner previously described.

Relay 212 is operated directly from ground over cam 601 and the lower contacts of cam 403, independent of key 222 to require the measurement of an initial time interval before testing for coin battery. Relay 311 does not operate in the normal position of brush 101 since that circuit is not closed in position 7 of the district class sequence switch but it is operated as previously described in position 10 or 20. Relay 318 is operated if the proper number of impulses are received to advance the test sequence switch 500 out of position 6.

The metering tests made in positions 5 and 6 of the test class sequence switch are similar to those made in position 3 except that the circuit is arranged in position 2 of the test sequence switch 500 to ground the tip and ring conductors of the line finder test line through the windings of relays 619 and 620, so that when the district selector tests the line in position 11 of sequence switch 1400, relay 1426 is operated in turn operating relay 1511 which locks and causes the operation of the second party relays 1002, 1202 and 1204 in place of the first party relays 1001, 1201 and 1203. In the test circuit relay 616 is operated to reverse the connection of the contacts of relays 715 and 716 so that the second party relay 715 controls the register relay 312 and the first party relay 716 controls the false party registration relay 216. Relays 619 and 620 are also employed in position 5 of the test class sequence switch to simulate a falsely grounded line, being connected to the line finder test line in position 15 of the test sequence switch, when relay 516 operates following the opening of the test line to release the district selector.

The trouble timing switch is provided for sounding the alarm if a trouble arises which unduly delays completion of any of the tests. Brush 850 belongs to this switch and relay 867 is operated over the normal contacts of brush 850 each time that a test is started. However, since the testing of the overtime feature consumes much more time than other tests the circuit is arranged to disable the timing switch during such tests. For this purpose the locking circuit of relay 867 extends over the back contact of relay 213. Therefore when relay 213 operates at the beginning of the meter testing operation, it opens the locking circuit of relay 867. Relay 867 in releasing opens the circuit by which it controls the trouble alarm and the trouble meter and also advances the trouble timing switch to its next normal position. When relay 318 operates at the successful completion of the metering test it releases relay 213, restoring the locking circuit of relay 867 and also closes an operating circuit for relay 867 at its outer left front contact thereby restarting the trouble timing operation.

What is claimed is:

1. In a telephone system, a selector switch, means including a set of terminals for associating said selector switch with calling lines, means associated with said selector switch for making a charge for calls extended by means of said selector switch including means for recording the zone to which a call is directed, and means for applying metering current to one of said terminals in accordance with the zone record, a testing device, means to associate said testing device with said selector switch, means in said testing device for causing the operation of said selector switch in simulation of a successful call, and means for testing the charging function of said selector switch including means for operating said recording means in accordance with any desired zone, means to count the number of applications of metering current to said one terminal, and means under the joint control of said operating means and said counting means to stop the operation of said testing device if the wrong number of applications of metering current is received.

2. In a telephone system, a selector switch, means including a set of terminals for associating said selector switch with calling lines, means associated with said selector switch for making a charge for calls extended by means of said selector switch including means for recording the zone to which a call is directed, and means for applying metering current to one of said terminals in accordance with the zone record, a testing device, means to associate said testing device with said selector switch, means in said testing device for causing the operation of said selector switch in simulation of a successful call, and means for testing the charging function of said selector switch including means for operating said recording means in accordance with any desired zone, means to count the number of applications of metering current to said one terminal, and means under the joint control of said operating means and said counting means to stop the operation of said testing device if metering current is applied a number of times greater than required by the zone record.

3. In a telephone system, a selector switch, means including a set of terminals for associating said selector switch with calling lines, means associated with said selector switch for making a charge for calls extended by means of said selector switch including means for recording the zone to which a call is directed, and means for applying metering current to one of said terminals in accordance with the zone record, a testing device, means to associate said testing device with said selector switch, means in said testing device for causing the operation of said selector switch in simulation of a successful call, and means for testing the charging function of said selector switch including means for operating said recording means in accordance with any desired zone, means to count the number of applications of metering current to said one terminal, and means under the joint control of said operating means and said counting means to stop the operation of said testing device if metering current is applied a number of times less than required by the zone record.

4. In a telephone system, a selector switch, means including a set of terminals for associating said selector switch with calling lines, means associated with said selector switch for making a charge for calls extended by means of said selector switch including means for recording the zone to which a call is directed, and means for applying metering current to one of said terminals in accordance with the zone record, a testing device, means to associate said testing device with said selector switch, means in said testing device for causing the operation of said selector switch in simulation of a successful call, and means for testing the charging function of said selector switch including means for operating said recording means in accordance with any desired zone, means to count the number of applications of metering current to said one terminal, and means under the joint control of said operating means and said counting means to advance the operation of said testing device if the metering current is applied the correct number of times as required by the zone record.

5. In a telephone system, a selector switch, means including a set of terminals for associating said selector switch with calling lines, means associated with said selector switch for making a charge for calls extended by means of said selector switch including means for applying metering current to one of said terminals at predetermined intervals during a call, a testing device, means for associating said testing device with said selector switch, means in said testing device for causing the operation of said selector switch in simulation of a successful call, and means for testing the charging function of said selector switch including means responsive to the reception of metering current, means under the control of said responsive means following the simulated successful completion of a call to initiate a timing operation, means under the control of said responsive means at the completion of said timing operation to initiate an additional timing operation and means under the control of said responsive means at the completion of said additional timing operation to initiate the further operation of said testing device.

6. In a telephone system, a selector switch, means including a set of terminals for associating said selector switch with calling lines, means associated with said selector switch for making a charge for calls extended by means of said selector switch including means for applying metering current to one of said terminals at predetermined intervals during a call, a testing device, means for associating said testing device with said selector switch, means in said testing device for causing the operation of said selector switch in simulation of a successful call, and means for testing the charging function of said selector switch including means responsive to the reception of metering current, means under the control of said responsive means following the simulated successful completion of a call to initiate a timing operation, means under the control of said responsive means at the completion of said timing operation to initiate an additional timing operation, means under the control of said responsive means at the completion of said additional timing operation to initiate the further operation of said testing device, and means effective if said responsive means fails to operate to prevent the further operation of said testing device.

7. In a telephone system, a selector switch, means including a set of terminals for associating said selector switch with calling lines, means associated with said selector switch for making a charge for calls extended by means of said selector switch including means for applying metering current to one of said terminals at predetermined intervals during a call, a testing device, means for associating said testing device with said selector switch, means in said testing device for causing the operation of said selector switch in simulation of a successful call, and means for testing the charging function of said selector switch including means responsive to the reception of metering current, means under the control of said responsive means following the simulated successful completion of a call to initiate a timing operation, means under the control of said responsive means at the completion of said timing operation to initiate an additional timing operation, means under the control of said responsive means at the completion of said additional timing operation to initiate the further operation of said testing device, and means under the control of said responsive means during said timing operation to prevent the further operation of said testing device.

8. In a telephone system, a selector switch, means including a set of terminals for associating said selector switch with calling lines, means associated with said selector switch for making a charge for calls extended by means of said selector switch including means for recording the zone to which a call is directed, and means for applying metering current to one of said terminals a number of times and at intervals depending upon said zone record, a testing device, means to associate said testing device with said selector switch, means in said testing device for causing the operation of said selector switch in simulation of a successful call, and means for testing the charging function of said selector switch including means for operating said recording means in accordance with any desired zone, means to count the number of applications of metering current to said one terminal, means under the joint control of said operating means and said counting means to initiate a timing operation, means to render said operating means and said counting means jointly effective at the end of said timing operation to initiate an additional timing operation, and means responsive to the reception of metering current at the end of said second timing operation to advance the operation of said testing device.

9. In a telephone system, a selector switch, means including a set of terminals for associating said selector switch with calling lines, means associated with said selector switch for making a charge for calls extended by means of said selector switch including means for recording the zone to which a call is directed, and means for applying metering current to one of said terminals a number of times and at intervals depending upon said zone record, a testing device, means to associate said testing device with said selector switch, means in said testing device for causing the operation of said selector switch in simulation of a successful call, and means for testing the charging function of said selector switch including means for operating said recording means in accordance with any desired zone, means to count the number of applications of metering current to said one terminal, means under the joint control of said operating means and said counting means to initiate a timing operation, means to render said operating means and said counting means jointly effective at the end of said timing operation to initiate an additional timing operation, means responsive to the reception of metering current at the end of said second timing operation to advance the operation of said testing device, and means responsive to the reception of metering current during either of said timing operations to stop said timing operations and to prevent the further operation of said testing device.

10. In a telephone system, a selector switch, means including a set of terminals for associating said selector switch with calling lines, means associated with said selector switch for making a charge for calls extended by means of said selector switch including means for recording the zone to which a call is directed, and means for applying metering current to one of said terminals a number of times and at intervals depending upon said zone record, a testing device, means to associate said testing device with said selector switch, means in said testing device for causing the operation of said selector switch in simulation of a successful call, and means for testing the charging function of said selector switch including means for operating said recording means in accordance with any desired zone, means to count the number of applications of metering current to said one terminal, means under the joint control of said operating means and said counting means to initiate a timing operation, means to render said operating means and said counting means jointly effective at the end of said timing operation to initiate an additional timing operation, and means effective if metering current is not received at the completion of either of said timing operations to prevent the further operation of said testing device.

11. In a telephone system, a selector switch, means including a set of terminals for associating said selector switch with calling lines, means associated with said selector switch for making a charge for calls extended by means of said selector switch including means for applying metering current to one of said terminals at predetermined intervals during a call, a testing device, means for associating said testing device with said selector switch, means in said testing device for causing the operation of said selector switch in simulation of a successful call, and means for testing the charging function of said selector switch including means responsive to the reception of metering current, means under the control of said responsive means following the simulated successful completion of a call to initiate a timing operation, means under the control of said responsive means at the completion of said timing operation to initiate an additional timing operation and means under the control of said responsive means at the completion of said additional timing operation to initiate the further operation of said testing device, trouble timing means started at the beginning of the operation of said selector switch and means for disabling said trouble timing means during said charge testing operation.

12. In a telephone system, selector switches, means including a set of terminals for associating said selector switches with calling lines, means associated with said selector switches for making a charge for calls extended by means of said selector switches, said charging means including in the case of certain of said selector switches means for making a single application of metering current to one of said terminals at predetermined intervals and including in the case of others of said selector switches means for recording the zone to which a call is directed and means for making application of metering current to said one terminal a number of times and at intervals depending upon said zone registration, a testing device, means for associating said testing device with one of said selector switches, means in said testing device for causing the operation of said selector switch in simulation of a successful call, and means for testing the charging function of said selector switch including means responsive to the reception of metering current over said one terminal, means for measuring a plurality of successive time intervals, means under the joint control of said timing means and said responsive means to advance the operation of said testing device, and means operated in accordance with the selector switch associated with said testing device to render said responsive means effective following the reception of a single application or a plurality of applications of metering current.

13. In a telephone system, selector switches, means including a set of terminals for associating said selector switches with calling lines, means associated with said selector switches for making a charge for calls extended by means of said selector switches, said means including in the case of certain of said selector switches means for making a single application of metering current to one of said terminals at predetermined intervals and including in the case of others of said selector switches, means for recording the zone to which a call is directed and means for making application of metering current to said one terminal a number of times and at intervals depending upon said zone registration, a testing device, means for associating said testing device with one of said selector switches, means in said testing device for causing the operation of said selector switch in simulation of a successful call, means for testing the charging function of said selector switch including means responsive to the reception of metering current over said one terminal, a series of counting relays, timing means, means under the control of one of said counting relays for initiating the operation of said timing means to measure a plurality of time intervals, and means operative in accordance with the kind of selector switch associated with said testing device for rendering said counting relay effective following a single application or a plurality of applications of metering current.

14. In a telephone system, selector switches, means including a set of terminals for associating said selector switches with calling lines, means associated with said selector switches for making a charge for calls extended by means of said selector switches, said means including in the case of certain of said selector switches means for making a single application of metering current to one of said terminals at predetermined intervals and including in the case of others of said selector switches, means for recording the zone to which a call is directed and means for making application of metering current to said one terminal a number of times and at intervals depending upon said zone registration, a testing device, means for associating said testing device with one of said selector switches, means in said testing device for causing the operation of said selector switch in simulation of a successful call, means for testing the charging function of said selector switch including means responsive to the reception of metering current over said one terminal, a series of pairs of counting relays, timing means, means under the control of one of said pairs of counting relays for initiating the operation of said timing means to measure a plurality of time intervals, means for operating said series of counting relays if said testing device is associated with one of said other selector switches, and means for operating said one pair of counting relays independent of said series if said testing device is associated with one of said other selector switches.

15. In a telephone system, selector switches, means including a set of terminals for associating said selector switches with calling lines, means associated with said selector switches for making a charge for calls extended by means of said selector switches, said means being effective in the case of certain of said selector switches at the beginning of the talking period and at predetermined intervals thereafter, and in the case of others of said selector switches at the end of a predetermined period, a testing device, means for associating said testing device with one of said selector switches, means in said testing device for causing the operation of said selector switch in simulation of a successful call, and means for testing the charging function of said selector switch including means responsive to the reception of charging current, timing means, and means operated in accordance with the kind of selector switch associated with said testing device to determine whether said responsive means shall be effective before or after the operation of said timing means.

16. In a telephone system, a selector switch, means including a set of terminals for associating said selector switch with calling lines, means associated with said selector switch for making a charge for calls extended by means of said selector switch including means for applying metering current to one of said terminals at predetermined intervals during a call, a testing device, means for associating said testing device with said selector switch, means in said testing device for causing the operation of said selector switch in simulation of a successful call, and means for testing the charging function of said selector switch including means responsive to the reception of metering current and means for timing the talking period, trouble timing means operated at the beginning of the operation of said selector switch, means operated at the beginning of said charge testing operation to disable said trouble timing means, and means to restart said trouble timing means at the successful completion of said charge testing operation.

17. In a telephone system, a selector switch, means including a set of terminals for associating said selector switch with party lines as calling lines, means associated with said selector switch for making a charge for calls extended by means of said selector switch including a connector circuit having a relay for each party on said calling line, means for applying metering current to one of said terminals, and means for operating one of said relays at each charging operation, a testing device, means for associating said testing device with said selector switch, means in said testing device for causing the operation of said selector switch in simulation of a successful call, and means for testing the charging functions of said selector switch including means for controlling said selector switch to operate one of said party relays, a plurality of means responsive to metering current each controlled by one of said party relays, means for advancing said testing operation, means for blocking said testing operation, and means for placing said advancing means and said blocking means selectively under the control of said responsive means in accordance with the party relay to be operated.

18. In a telephone system, a selector switch, means including a set of terminals for associating said selector switch with party lines as calling lines, means associated with said selector switch for making a charge for calls extended by means of said selector switch including a connector circuit having a relay for each party on said calling line, means for applying metering current to one of said terminals, and means for operating one of said relays at each charging operation, a testing device, means for associating said testing device with said selector switch, means in said testing device for causing the operation of said selector switch in simulation of a successful call, and means for testing the charging functions of said selector switch including means effective during one test of said selector switch for controlling said selector switch to operate one of said party relays, first means responsive to metering current controlled by said one party relay, other means responsive to metering current controlled by the other party relay, means under the control of said first responsive means for advancing the testing operation, and means under the control of said other responsive means to block said testing operation, means effective during another test of said selector switch for controlling said selector switch to operate the other of said party relays, and means for transferring said advancing means to the control of said other responsive means and said preventing means to the control of said first responsive means.

19. A routine testing device for testing selector switches equipped with means for performing a metering operation a number of times dependent upon the destination of calls extended thereby, said testing device including means for establishing metering conditions in selector switches and means responsive to the resultant metering operations.

20. A routine testing device for testing selector switches equipped with means for performing a metering operation a number of times dependent upon the destination of calls extended thereby, said testing device including means for establishing metering conditions in selector switches and means responsive only if the number of metering operations corresponds to the metering condition established.

21. A routine testing device for testing selector switches equipped with means for performing a metering operation a number of times dependent upon the destination of calls extended thereby, said testing device including means for operating selector switches to predetermine different metering conditions, means responsive to metering operations to permit tests to proceed and means to modify said responsive means to permit tests to proceed only if the number of metering operations corresponds to the predetermined condition.

JOSEPH W. DEHN.